(12) United States Patent
Aoki et al.

(10) Patent No.: US 11,881,341 B2
(45) Date of Patent: Jan. 23, 2024

(54) METHOD OF MANUFACTURING CORE SHEET INCLUDING INSULATION COATING REMOVING STEP

(71) Applicants: DENSO CORPORATION, Kariya (JP); NIPPON STEEL CORPORATION, Tokyo (JP)

(72) Inventors: Tetsuya Aoki, Kariya (JP); Makoto Taniguchi, Kariya (JP); Atsuo Ishizuka, Kariya (JP); Satoshi Doi, Kariya (JP); Keiichi Okazaki, Kariya (JP); Hiroshi Fujimura, Tokyo (JP); Tatsuya Takase, Tokyo (JP)

(73) Assignees: DENSO CORPORATION, Kariya (JP); NIPPON STEEL CORPORATION, Tokyo (JP)

( * ) Notice: Subject to any disclaimer, the term of this patent is extended or adjusted under 35 U.S.C. 154(b) by 846 days.

(21) Appl. No.: 16/835,671

(22) Filed: Mar. 31, 2020

(65) Prior Publication Data

US 2020/0234870 A1 Jul. 23, 2020

Related U.S. Application Data

(63) Continuation of application No. PCT/JP2018/037368, filed on Oct. 5, 2018.

(30) Foreign Application Priority Data

Oct. 5, 2017 (JP) .................. 2017-195345

(51) Int. Cl.
*H01F 27/245* (2006.01)
*H01F 1/18* (2006.01)
(Continued)

(52) U.S. Cl.
CPC ............. *H01F 27/245* (2013.01); *H01F 1/18* (2013.01); *H02K 1/16* (2013.01); *H02K 15/024* (2013.01); *H02K 15/026* (2013.01)

(58) Field of Classification Search
CPC ........ H01F 1/18; H01F 27/245; H01F 41/024; H02K 1/04; H02K 1/12; H02K 1/16; H02K 15/02; H02K 15/024
See application file for complete search history.

(56) References Cited

U.S. PATENT DOCUMENTS 4,615,207 A * 10/1986 Oboshi .................. B21D 28/22
72/400
2013/0129984 A1 5/2013 Omura et al.
(Continued)

FOREIGN PATENT DOCUMENTS

JP H07298569 A 11/1995
JP H09-092561 A 4/1997
(Continued)

*Primary Examiner* — Minh N Trinh
(74) *Attorney, Agent, or Firm* — Harness, Dickey & Pierce, P.L.C.

(57) ABSTRACT

Disclosed is a method of manufacturing a core sheet. The core sheet has an annular core back portion and a plurality of tooth portions extending from the core back portion toward a radial center thereof. The method includes a blanking step, a rolling step and a removing step. In the removing step, an insulation coating, which is on a region of a grain-oriented magnetic steel sheet for forming a band-shaped core back portion, on a band-shaped core back portion of a sheet piece or on the core back portion of the core sheet, is at least partially removed.

15 Claims, 15 Drawing Sheets

(51) Int. Cl.
*H02K 15/02* (2006.01)
*H02K 1/16* (2006.01)

(56) References Cited

U.S. PATENT DOCUMENTS

| | | |
|---|---|---|
| 2017/0040849 A1 | 2/2017 | Lin |
| 2020/0234870 A1* | 7/2020 | Aoki .................... H02K 15/02 |

FOREIGN PATENT DOCUMENTS

| | | |
|---|---|---|
| JP | H10271716 A | 10/1998 |
| JP | 2007007690 A | 1/2007 |
| JP | 2007-336690 A | 12/2007 |
| JP | 4401736 B2 | 1/2010 |
| JP | 4890375 B2 | 3/2012 |
| JP | 2012090391 A | 5/2012 |
| JP | 2016094655 A | 5/2016 |
| JP | 2017-514440 A | 6/2017 |

* cited by examiner

METHOD OF MANUFACTURING CORE SHEET INCLUDING INSULATION COATING REMOVING STEP

CROSS-REFERENCE TO RELATED APPLICATIONS

The present application is a continuation application of International Application No. PCT/JP2018/037368 filed on Oct. 5, 2018, which is based on and claims priority from Japanese Patent Application No. 2017-195345 filed on Oct. 5, 2017. The contents of these applications are hereby incorporated by reference in their entirety into the present application.

BACKGROUND

1 Technical Field

The present disclosure relates to core sheets which have an annular core back portion and a plurality of tooth portions extending from the core back portion toward a radial center thereof, and to methods of manufacturing the core sheets.

2 Description of Related Art

In rotating electric machines such as electric generators and electric motors, there are employed stator cores which are formed by laminating a plurality of annular core sheets each having an annular core back portion and tooth portions. To achieve reduction in the sizes of the rotating electric machines and improvement in the performances, such as the outputs, of the rotating electric machines, it is desired to control the easy directions of magnetization in the core sheets each of which is formed of a magnetic steel sheet. Specifically, it is desired to have the easy directions of magnetization in the tooth portions, each of which extends in a radial direction of the annular core sheet, coinciding with the respective extending directions of the tooth portions. In addition, an easy direction of magnetization is also referred to as the direction of an easy axis of magnetization.

SUMMARY

According to the present disclosure, there is provided a first method of manufacturing a core sheet. The core sheet has an annular core back portion and a plurality of tooth portions extending from the core back portion toward a radial center thereof. The first method includes: a blanking step of blanking out a sheet piece from a grain-oriented magnetic steel sheet, the grain-oriented magnetic steel sheet having an easy direction of magnetization in one in-plane direction and an insulation coating formed on its surface to apply tension in the easy direction of magnetization, the sheet piece having a band-shaped core back portion extending in a perpendicular direction to the easy direction of magnetization and a plurality of parallel tooth portions extending, from the band-shaped core back portion, parallel to the easy direction of magnetization; a rolling step of rolling the sheet piece, with the parallel tooth portions being on an inner side, into an annular shape, thereby obtaining the core sheet having the core back portion and the tooth portions; and a removing step of at least partially removing the insulation coating on the band-shaped core back portion of the sheet piece or the insulation coating on the core back portion of the core sheet.

According to the present disclosure, there is also provided a second method of manufacturing a core sheet. The core sheet has an annular core back portion and a plurality of tooth portions extending from the core back portion toward a radial center thereof. The second method includes: a removing step of at least partially removing, from a grain-oriented magnetic steel sheet having an easy direction of magnetization in one in-plane direction and an insulation coating formed on its surface to apply tension in the easy direction of magnetization, the insulation coating on a region for forming a band-shaped core back portion which extends in a perpendicular direction to the easy direction of magnetization; a blanking step of blanking out a sheet piece from the grain-oriented magnetic steel sheet, the sheet piece having a band-shaped core back portion present in the region for forming a band-shaped core back portion and a plurality of parallel tooth portions extending, from the band-shaped core back portion, parallel to the easy direction of magnetization; and a rolling step of rolling the sheet piece, with the parallel tooth portions being on an inner side, into an annular shape, thereby obtaining the core sheet having the core back portion and the tooth portions.

According to the present disclosure, there is also provided a core sheet. The core sheet has an annular core back portion and a plurality of tooth portions extending from the core back portion toward a radial center thereof. The core back portion and the tooth portions are formed of a grain-oriented magnetic steel sheet to have an extending direction of each of the tooth portions coinciding with an easy direction of magnetization of the grain-oriented magnetic steel sheet. The tooth portions have an insulation coating formed thereon to apply tension in the easy direction of magnetization of the grain-oriented magnetic steel sheet. The core back portion has no insulation coating formed thereon.

DESCRIPTION OF EMBODIMENTS

Figure 1A:
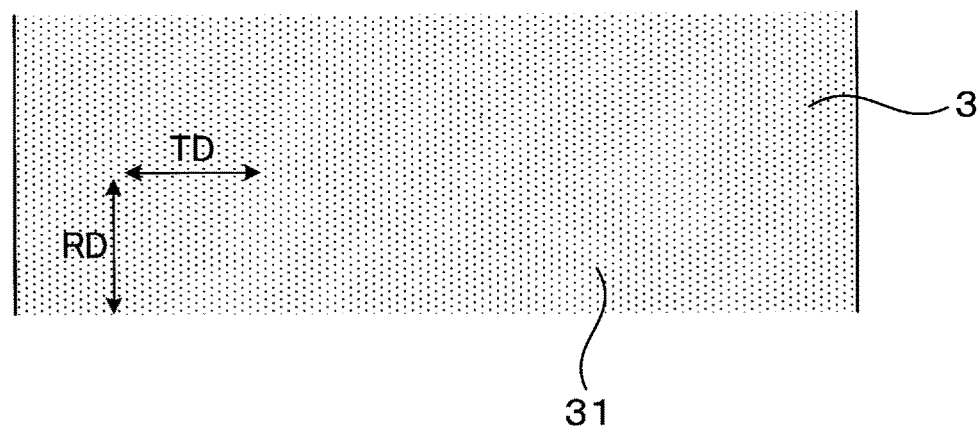
FIG. 1A is a plan view of a grain-oriented magnetic steel sheet according to a first embodiment.

For example, in Japanese Patent Application Publication No. JP H09-92561 A, there is disclosed a technique of manufacturing a core sheet by: blanking out a band-shaped sheet piece, which has a core back portion and tooth portions, from a grain-oriented magnetic steel sheet having a single easy direction of magnetization; and then rolling the sheet piece into an annular shape. With this technique, it is possible to manufacture a core sheet where the easy directions of magnetization in the tooth portions coincide with the respective extending directions of the tooth portions.

However, the grain-oriented magnetic steel sheet has the single easy direction of magnetization. Therefore, when the core sheet is manufactured by blanking out the sheet piece so as to have the extending direction of each of the tooth portions of the sheet piece coinciding with the easy direction of magnetization of the grain-oriented magnetic steel sheet and then rolling the sheet piece into the annular shape, the core back portion of the core sheet has easy directions of magnetization coinciding with the extending directions of the tooth portions of the core sheet. Actually, the desired easy direction of magnetization in the annular core back portion is the circumferential direction.

In the core back portion, if the ease of magnetization is high in the directions perpendicular to the circumferential direction, i.e., high in the extending directions of the tooth portions, magnetization in a magnetic circuit of the stator core will become difficult, lowering the magnetic properties. That is, in the core sheet, the magnetic properties will become high in the tooth portions, but low in the core back portion.

On the surface of a grain-oriented magnetic steel sheet, there is generally formed an insulation coating. By the insulation coating, insulation properties are imparted to the grain-oriented magnetic steel sheet. Moreover, by the insulation coating, tension is applied in the easy direction of magnetization of the grain-oriented magnetic steel sheet, lowering the iron loss. That is, by the insulation coating, the magnetic reluctance is lowered and the magnetic properties are improved in the easy direction of magnetization.

However, while the lowering of the magnetic reluctance in the easy direction of magnetization is advantageous to improvement of the magnetic properties in the tooth portions, it is disadvantageous to improvement of the magnetic properties in the core back portion. This is because in the core back portion, it is desired to improve the magnetic properties in the circumferential direction that is perpendicular to the easy direction of magnetization. Accordingly, there is room for further improvement of the magnetic properties in the entire core sheet; thus further improvement is desired for achieving reduction in the sizes of the rotating electric machines and improvement in the performances, such as the outputs, of the rotating electric machines.

The present disclosure has been made in view of the above problems, and aims to provide a core sheet, which has excellent magnetic properties in both the core back portion and the tooth portions, and a method of manufacturing the core sheet.

In the above-described manufacturing methods according to the present disclosure, the parallel tooth portions are formed each of which extends parallel to the easy direction of magnetization of the grain-oriented magnetic steel sheet; the sheet piece is rolled, with the parallel tooth portions being on the inner side, into an annular shape. Consequently, in the core back portion and the tooth portions, it becomes possible to have the easy directions of magnetization coinciding with radial directions of the annular core sheet. As a result, it becomes possible to lower the magnetic reluctance of the tooth portions and improve the magnetic properties of the tooth portions.

On the other hand, in the core back portion, the desired easy direction of magnetization is actually the circumferential direction of the annular core back portion. Therefore, in the core back portion, if the ease of magnetization is high in the directions perpendicular to the circumferential direction, i.e., high in the extending directions of the tooth portions, the magnetic reluctance in the circumferential direction will become high and thus magnetization will become difficult.

The grain-oriented magnetic steel sheet is manufactured such that tension is applied in the easy direction of magnetization during the firing of the insulation coating. Consequently, the iron crystals are extended in micron order in the easy direction of magnetization. Moreover, the iron crystals generally have a property such that they extend upon application of a magnetic field in the easy direction of magnetization. Therefore, having the iron crystals extended in the easy direction of magnetization in advance by the tension applied by the insulation coating in the easy direction of magnetization, no energy is needed to deform the iron crystals during application of a magnetic field; thus it becomes easy for the grain-oriented magnetic steel sheet to be magnetized (i.e., the magnetic properties are enhanced) in the easy direction of magnetization. In contrast, in the perpendicular direction to the easy direction of magnetization, the magnetic properties are lowered due to strain caused by the tension applied by the insulation coating in the easy direction of magnetization.

In the above-described manufacturing methods according to the present disclosure, the insulation coating on the core back portion is at least partially removed in the removing step. Consequently, it becomes possible to relieve or eliminate the tension in the easy direction of magnetization which has been applied to the core back portion by the insulation coating. As a result, in the core back portion, though the magnetic properties are lowered (i.e., the magnetic reluctance is increased) in the extending directions of the tooth portions (i.e., in the radial directions of the core sheet), the magnetic properties are improved (i.e., the magnetic reluctance is lowered) in the circumferential direction of the core sheet. That is, it becomes possible to improve the magnetic properties of the core back portion in the circumferential direction which is the desired direction. On the other hand, in the tooth portions, with the insulation coating remaining thereon, it becomes possible to prevent the magnetic properties in the radial directions of the core sheet from being lowered.

Accordingly, with the above manufacturing methods according to the present disclosure, it becomes possible to manufacture the core sheet which has the magnetic properties of the core back portion in the circumferential direction improved while maintaining the excellent magnetic properties of the tooth portions in the radial directions of the core sheet. In other words, it becomes possible to provide the manufacturing methods with which the magnetic properties of the entire core sheet can be improved.

Moreover, the core sheet, which has the insulation coating on the tooth portions but no insulation coating on the core back portion, is excellent in both the magnetic properties of the tooth portions in the respective extending directions thereof and the magnetic properties of the core back portion in the circumferential direction. Specifically, in the tooth portions, since the tension applied to the grain-oriented magnetic steel sheet by the insulation coating is maintained, the ease of magnetization in the radial directions of the core sheet is kept at a high level. On the other hand, in the core back portion, since the tension applied to the grain-oriented magnetic steel sheet by the insulation coating is relieved or eliminated, the ease of magnetization in the radial directions of the core sheet is lowered while the ease of magnetization in the circumferential direction of the annular core back portion is improved.

As above, the core sheet according to the present disclosure, which has the insulation coating on the tooth portions but no insulation coating on the core back portion, is excellent in magnetic properties in the desired directions in both the tooth portions and the core back portion.

Hereinafter, exemplary embodiments and their modifications will be described with reference to the drawings.

First Embodiment

A first embodiment relating to a manufacturing method of a core sheet will be described with reference to FIGS. 1A-6. In the present embodiment, as illustrated in FIGS. 1A-1D, a core sheet 1 is manufactured by performing a removing step and a rolling step after a blanking step. The core sheet 1 has an annular core back portion 11 and a plurality of tooth portions 12 extending from the core back portion 11 toward a radial center O thereof (i.e., radially inward).

In the present embodiment, the core sheet 1 is manufactured by performing the blanking step, the removing step and the rolling step. Each of the steps is outlined as follows.

Figure 1B:
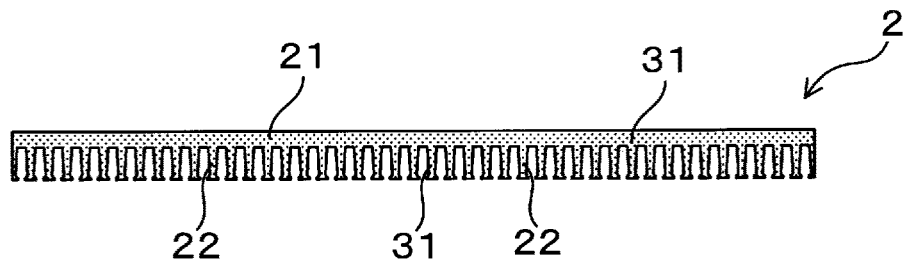
FIG. 1B is a plan view of a sheet piece according to the first embodiment.

As illustrated in FIG. 1A and FIG. 1B, in the blanking step, a sheet piece 2 is blanked out from a grain-oriented magnetic steel sheet 3. The sheet piece 2 has a band-shaped core back portion 21 extending in a perpendicular direction TD to the easy direction RD of magnetization of the sheet piece 2 and a plurality of parallel tooth portions 22 extending parallel to the easy direction RD of magnetization.

Figure 1C:
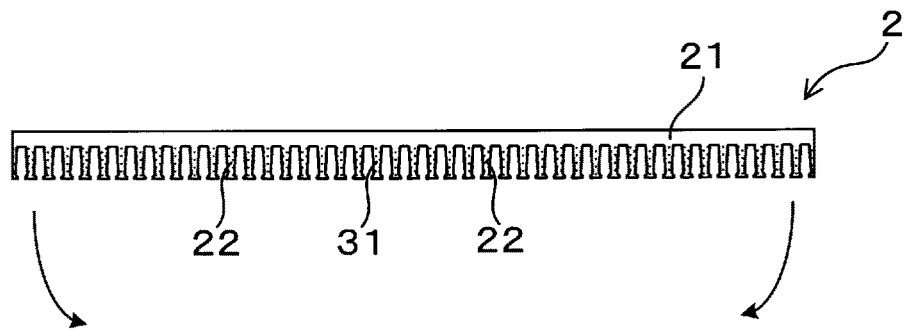
FIG. 1C is a plan view of the sheet piece according to the first embodiment, where an insulation coating has been removed from a band-shaped core back portion.
Figure 1D:
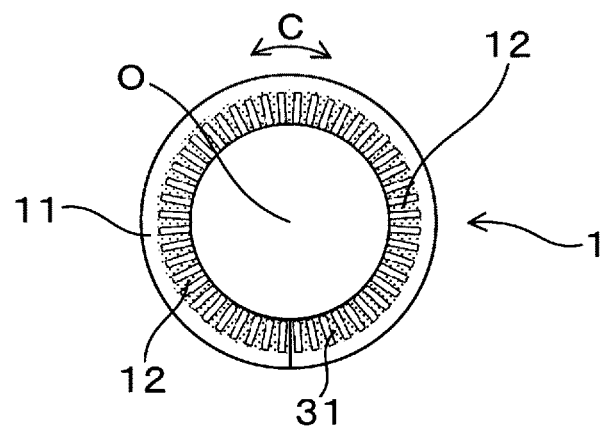
FIG. 1D is a plan view of a core sheet according to the first embodiment, which has a core back portion from which the insulation coating has been removed.

As illustrated in FIG. 1B and FIG. 1C, in the removing step, an insulation coating 31 on the band-shaped core back portion 21 of the sheet piece 2 is at least partially removed. As illustrated in FIG. 1C and FIG. 1D, in the rolling step, the sheet piece 2 is rolled, with the parallel tooth portions 22 being on the inner side, into an annular shape. Consequently, the core sheet 1 is obtained which has the core back portion 11 and the tooth portions 12. Hereinafter, each of the steps will be described in detail.

As illustrated in FIG. 1A, the grain-oriented magnetic steel sheet 3 has the easy direction RD of magnetization in one in-plane direction. That is, the grain-oriented magnetic steel sheet 3 is a magnetic steel sheet which has a single easy direction RD of magnetization coinciding with one of in-plane directions of the plate-shaped magnetic steel sheet. The in-plane directions denote directions perpendicular to a thickness direction Z of the magnetic steel sheet. In general, the easy direction RD of magnetization is parallel to the rolling direction. Accordingly, the perpendicular direction TD to the easy direction RD of magnetization is generally perpendicular to the rolling direction. In addition, the grain-oriented magnetic steel sheet 3 may be implemented by a commercially available grain-oriented magnetic steel sheet, such as 23ZH85 produced by Nippon Steel Corporation.

Figure 2:
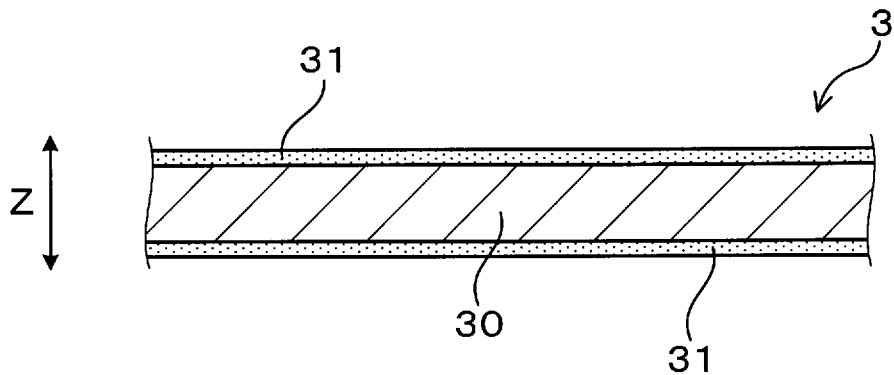
FIG. 2 is a cross-sectional view of the grain-oriented magnetic steel sheet according to the first embodiment.

As illustrated in FIG. 2, the grain-oriented magnetic steel sheet 3 includes a steel sheet 30 and an insulation coating 31 formed on the surface of the steel plate 30. The insulation coating 31 is a coating which imparts insulation properties to the grain-oriented magnetic steel sheet 3 while applying tension in the easy direction RD of magnetization of the steel sheet 30 to reduce iron loss of the grain-oriented magnetic steel sheet 3. In addition, the insulation coating 31 may be formed on both faces of the steel plate 30 as illustrated in FIG. 2, or on only one face of the steel plate 30.

The determination as to whether the insulation coating 31 is a coating which applies tension can be made by checking whether the steel sheet is warped upon removal of the insulation coating 31 from the grain-oriented magnetic steel sheet 3. Alternatively, the determination can be made by comparing the iron loss of the grain-oriented magnetic steel sheet 3 having the insulation coating 31 formed thereon and the iron loss of the grain-oriented magnetic steel sheet 3 from which the insulation coating 31 has been removed. That is, when at least one of warp of the steel sheet and change in the iron loss of the steel sheet has occurred upon removal of the insulation coating 31, the insulation coating 31 is determined to be a coating which applies tension.

In the case of making the determination by checking warp, the insulation coating 31 on one face of the grain-oriented magnetic steel sheet 3 is removed while the insulation coating 31 on the other face that is on the opposite side to the removal face is left without being removed. Then, if warp of the steel sheet 30 has occurred on the removal face side, the insulation coating 31 is determined to be a coating which applies tension. On the other hand, in the case of making the determination by checking change in the iron loss, two iron-loss test pieces are taken in the easy direction RD of magnetization respectively from the grain-oriented magnetic steel sheet 3 having the insulation coating 31 formed thereon and the grain-oriented magnetic steel sheet 3 from which the insulation coating 31 has been removed. Then, the iron losses of the test pieces are measured by a single sheet tester and compared with each other. If the iron loss of the grain-oriented magnetic steel sheet 3 in the easy direction RD of magnetization has been lowered by removal of the insulation coating 31, the insulation coating 31 is determined to be a coating which applies tension.

The insulation coating 31 is formed of ceramic, glass, a metal oxide or the like. In the present specification, the insulation coating 31 is a concept which excludes passive films that may be formed on the surfaces of metals such as steel. The insulation coating 31 may be formed in a single layer, or two or more layers. The thickness of the insulation coating 31 is, for example, 0.1-10 µm. In the case of the insulation coating 31 being formed in a plurality of layers, the thickness of the insulation coating 31 is equal to the sum of thicknesses of all the layers. On the other hand, the thickness of the steel sheet 30 is, for example, 0.1-1.0 mm. It is preferable that the thickness of the steel sheet 30 is 0.15-0.35 mm.

As illustrated in FIG. 1A and FIG. 1B, in the blanking step, the sheet piece 2 is blanked out from the grain-oriented magnetic steel sheet 3. Specifically, the sheet piece 2 is blanked out so as to have the band-shaped core back portion 21 extending in the perpendicular direction TD to the easy direction RD of magnetization of the grain-oriented magnetic steel sheet 3. That is, the longitudinal direction of the band-shaped core back portion 21 is parallel to the perpendicular direction TD to the easy direction RD of magnetization. On the other hand, the parallel tooth portions 22 extend parallel to the easy direction RD of magnetization of the grain-oriented magnetic steel sheet 3. In addition, as illustrated in FIG. 1B, the sheet piece 2 is comb-shaped to have the parallel tooth portions 22 formed in the shape of comb teeth.

In the present specification, the term □perpendicular direction□ encompasses not only the direction of 90° but also directions close to the direction of 90° in appearance. Similarly, the term □parallel direction□ encompasses not only the direction of 180° or 360° but also directions close to the direction of 180° or 360° in appearance.

Next, in the removing step, the insulation coating 31 on the band-shaped core back portion 21 is removed. The insulation coating 31 on the band-shaped core back portion 21 may be either completely removed, or partially removed to have part of the insulation coating 31 left thereon. Here, the expression □completely removed□ denotes that substantially all the insulation coating 31 is removed. In addition, inevitable residual traces of the insulation coating 31, which cannot be avoided during performing the removing step, may be tolerated.

In the case of the insulation coating 31 on the band-shaped core back portion 21 being completely removed, the tension applied by the insulation coating 31 to the band-shaped core back portion 21 disappears or becomes sufficiently low. Consequently, in the band-shaped core back portion 21, the magnetic reluctance in the easy direction RD of magnetization is increased while the magnetic reluctance in the perpendicular direction TD is lowered. As a result, it becomes possible to improve the magnetic properties of the core back portion 11 of the core sheet 1 in the circumferential direction C.

On the other hand, in the case of the insulation coating 31 on the band-shaped core back portion 21 being partially removed, part of the insulation coating 31 remains on the band-shaped core back portion 21. Consequently, it becomes possible to have part of the insulation coating 31, which has insulation properties, remaining on the core back portion 11 of the core sheet 1. Thus, when a plurality of core sheets 1 are laminated to form, for example, a stator core of a rotating electric machine, it is possible to prevent or suppress electrical insulation between the core back portions 11 of the core sheets 1 from being lowered. As a result, it is possible to suppress eddy current loss in the core back portions 11 of the core sheets 1. Moreover, by partially removing the insulation coating 31 on the band-shaped core back portion 21, it is also possible to lower the tension applied to the band-shaped core back portion 21 and thus possible to improve the magnetic properties in the circumferential direction C. In addition, the effect of removing the insulation coating 31 from the band-shaped core back portion 21 on improvement of the magnetic properties of the core back portion 11 of the core sheet 1 in the circumferential direction C is considered to be higher in the case of completely removing the insulation coating 31 than in the case of partially removing the insulation coating 31.

In the case of the insulation coating 31 being formed on both the faces of the steel plate 30, it is possible to remove the insulation coating 31 either from both the faces or from only one of the faces while leaving it on the other face. It is preferable to remove the insulation coating 31 from both the faces of the steel plate 30. In this case, it is possible to further enhance the effect of removing the insulation coating 31 on improvement of the magnetic properties as described above.

The insulation coating 31 may be removed by laser peening, shot peening, water jet peening, ultrasonic peening, electron-beam machining, grinding, or an agent such as an acid or alkali. In addition, methods of removing the insulation coating 31 are not limited to the above.

It is preferable that the insulation coating 31 is removed by laser peening, shot peening or water jet peening. It is further preferable that the insulation coating 31 is removed by laser peening. In this case, the removal accuracy is improved so that when partially removing the insulation coating 31, it is easy to form a coating-remaining region 111 in a desired shape. Moreover, in the case of the insulation coating 31 being removed by laser peening or shot peening, the removing step is performed in the atmosphere, preventing rust from being produced. Moreover, in the case of the insulation coating 31 being removed by laser peening or water jet peening, it is unnecessary to use grinding media that may cause intrusion of foreign substances; thus it is possible to suppress intrusion of foreign substances. Furthermore, in the case of the insulation coating 31 being removed by laser peening, it is possible to perform the peening process as an in-line process at high speed.

Figure 3A:
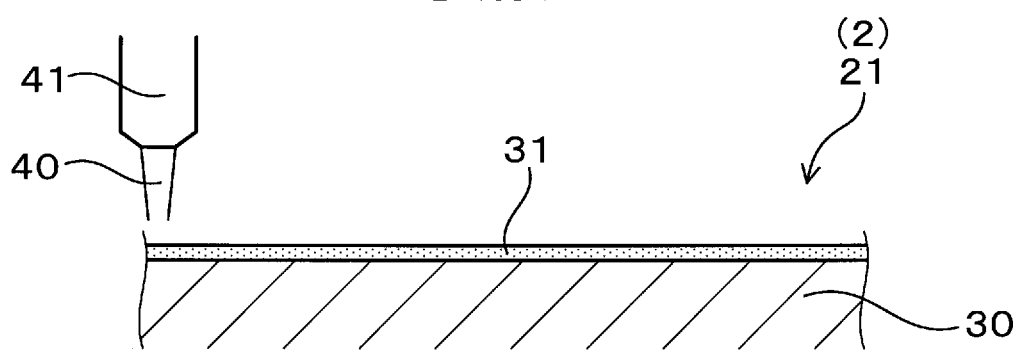
FIG. 3A is a schematic view illustrating the manner of irradiating a laser beam onto the insulation coating using a laser peening device according to the first embodiment.
Figure 3B:
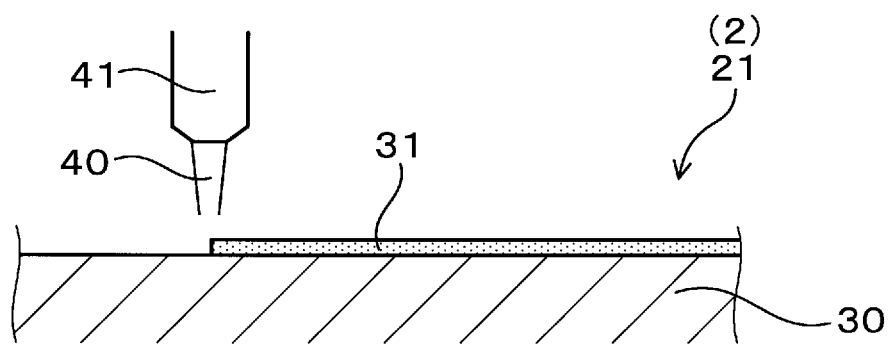
FIG. 3B is a schematic view illustrating the removal of the insulation coating by the irradiation of the laser beam according to the first embodiment.

As illustrated in FIG. 3A and FIG. 3B, in the case of removing the insulation coating 31 by laser peening, a laser beam 40 is irradiated from a nozzle 41 of a laser peening device onto the band-shaped core back portion 21 of the sheet piece 2. By the irradiation of the laser beam 40, the insulation coating 31 on the band-shaped core back portion 21 of the sheet piece 2 is removed. The irradiation position can be changed by changing the relative position between the nozzle 41 and the band-shaped core back portion 21. Consequently, the insulation coating 31 on the band-shaped core back portion 21 can be removed either completely or partially.

In the removing step, it is preferable to have the insulation coating 31 on the parallel tooth portions 22 left without being removed. In this case, the tension applied by the insulation coating 31 to the parallel tooth portions 22 is maintained; thus the magnetic reluctance of the parallel tooth portions 22 in the easy direction RD of magnetization can be kept low.

Next, the rolling step is performed. In FIG. 1C, the two arrows extending downward respectively from the two ends of the sheet piece 2 indicate the direction of rolling the sheet piece 2 in the rolling step. As illustrated in FIG. 1C and FIG. 1D, in the rolling step, a rolling process is performed to roll the sheet piece 2, with the parallel tooth portions 22 being on the inner side, into an annular shape. Since the sheet piece 2 is curled, the rolling process may also be referred to as curling process.

In the rolling step, the band-shaped core back portion 21 of the sheet piece 2 is transformed into the annular core back portion 11 of the core sheet 1 while the parallel tooth portions 22 of the sheet piece 2 is transformed into the tooth portions 12 of the core sheet 1. In addition, the rolling process is performed so as to have the extending direction L of each of the tooth portions 12 oriented toward the radial center O of the annular core back portion 11.

As in the present embodiment, it is preferable for the rolling step to be performed after the removing step. In this case, it is possible to suppress or prevent the insulation coating 31 from being crushed in the rolling step. Specifically, in the rolling step, tensile elongation occurs in an outer peripheral part of the band-shaped core back portion 21 while compressive strain occurs in an inner peripheral part of the band-shaped core back portion 21 during the rolling process. At this time, if there remains the insulation coating 31 on the outer peripheral part and/or the inner peripheral part of the band-shaped core back portion 21, the insulation coating 31 may be crushed and thus crushed powder may be produced. As described above, in the removing step, the insulation coating 31 is completely removed from the band-shaped core back portion 21 or partially removed from the outer peripheral part and/or the inner peripheral part of the band-shaped core back portion 21. Consequently, it becomes possible to prevent or suppress crushed powder from being produced in the subsequent rolling step. As a result, it becomes possible to prevent a failure from occurring in the rolling machine due to crushed powder; thus it becomes possible to prevent the sheet piece 2 from being jammed in the rolling machine during the rolling process and to prevent the core sheet 1 from being damaged.

An annealing step may be performed after the rolling step. In the annealing step, the core sheet 1 is heated. By performing the annealing step, the core sheet 1 can be recrystallized. The heating temperature in the annealing step may be suitably adjusted according to the material composition. For example, the heating temperature may be adjusted in a range of, for example, 700-1000° C. The annealing step is an arbitrary step and may be performed with arbitrary timing. That is, the annealing step may or may not be included in the manufacturing method of the core sheet 1 according to the present embodiment. Moreover, the annealing step may alternatively be performed before the rolling step. For example, the annealing step may be performed on the core sheet 2 before or after the removing step.

Figure 4:
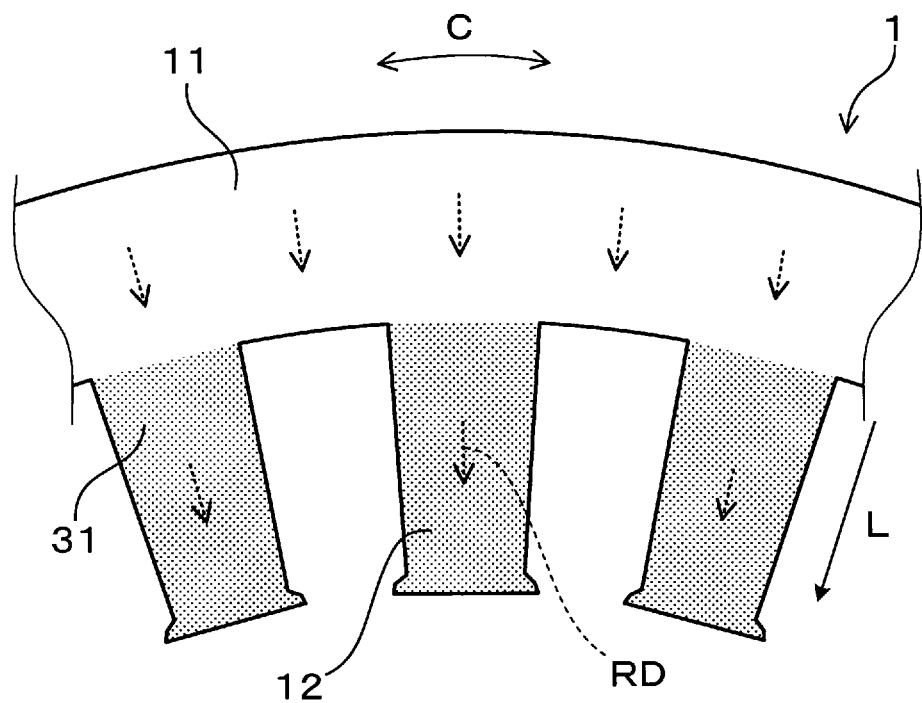
FIG. 4 is an enlarged plan view of the core sheet according to the first embodiment, where the insulation coating has been removed from the core back portion.
Figure 5:
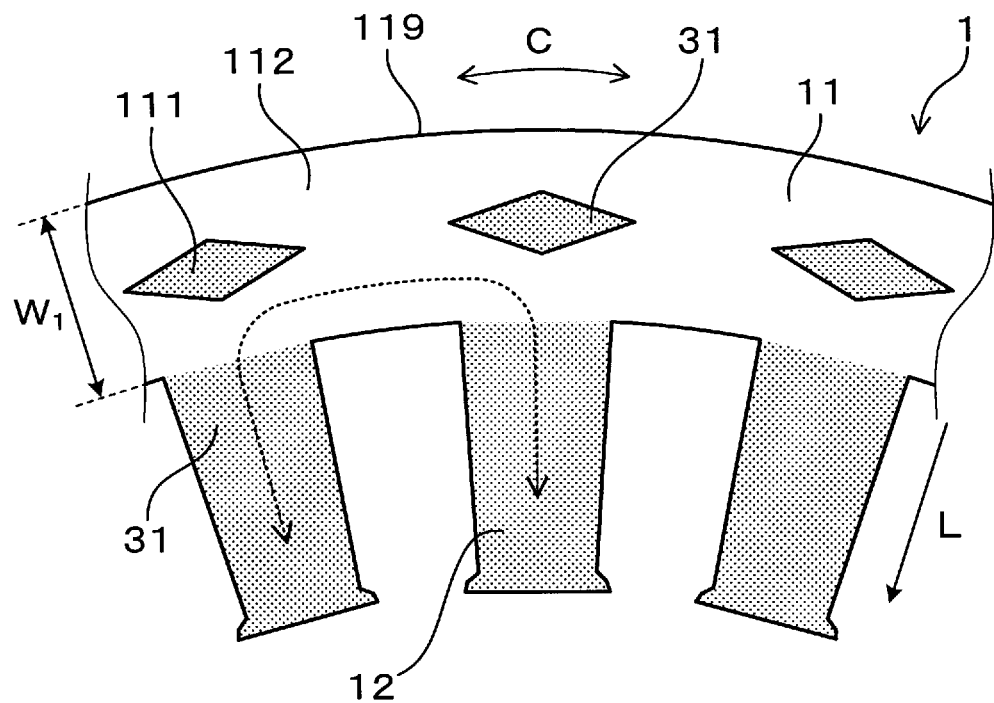
FIG. 5 is an enlarged plan view of a core sheet according to the first embodiment, where the insulation coating has been partially removed from the core back portion.

The core sheet 1 can be manufactured as described above. In the case of the insulation coating 31 on the band-shaped core back portion 21 being completely removed in the removing step, it is possible to obtain the core sheet 1 which has no insulation coating 31 on the core back portion 11 as illustrated in FIG. 4. On the other hand, in the case of the insulation coating 31 on the band-shaped core back portion 21 being partially removed in the removing step, it is possible to obtain the core sheet 1 which has the core back portion 11 where there are formed both non-coating-remaining regions 112 and coating-remaining regions 111 as illustrated in FIG. 5. Each of the non-coating-remaining regions 112 is a region from which the insulation coating 31 has been removed. Each of the coating-remaining regions 111 is a region in which the insulation coating 31 remains. The formation pattern of the non-coating-remaining regions 112 and the coating-remaining regions 111 illustrated in FIG. 5 is merely an example, and may be modified, for example, as illustrated in the fourth embodiment and the first to the fourth modifications which will be described later.

In the manufacturing method according to the present embodiment, as illustrated in FIG. 1A to FIG. 1D, the sheet piece 2 is blanked out from the grain-oriented magnetic steel sheet 3. The sheet piece 2 has the parallel tooth portions 22 extending parallel to the easy direction RD of magnetization and the band-shaped core back portion 21 extending in the perpendicular direction TD to the easy direction RD of magnetization. Then, the sheet piece 2 is rolled, with the parallel tooth portions 22 being on the inner side, into an annular shape. Consequently, as illustrated in FIG. 4 and FIG. 5, in each of the tooth portions 12 of the core sheet 1 obtained by the above manufacturing method, it becomes possible to have the easy direction RD of magnetization coinciding with the extending direction L of the tooth portion 12, i.e., with a direction toward the radial center O of the annular core sheet 1. As a result, it becomes possible to improve the magnetic properties of the tooth portions 12. In addition, while the easy direction RD of magnetization is indicated with a dashed-line arrow in FIG. 4, it is not indicated in FIG. 5 where it is the same as in FIG. 4.

On the other hand, in the core back portion 11, the desired easy direction RD of magnetization is actually the circumferential direction C of the annular core back portion 11. Therefore, in the core back portion 11, if the ease of magnetization is high in the directions perpendicular to the circumferential direction C, i.e., high in the extending directions L of the tooth portions 12, the magnetic reluctance in the circumferential direction C will become high and thus magnetization will become difficult. That is, the magnetic properties of the core back portion 11 will be lowered.

In the manufacturing method according to the present embodiment, as illustrated in FIG. 1B and FIG. 1C, the insulation coating 31 on the core back portion 11 is at least partially removed in the removing step. Consequently, it becomes possible to relieve or eliminate the tension in the easy direction RD of magnetization which has been applied to the core back portion 11 by the insulation coating 31.

Accordingly, in the core back portion 11, the magnetic properties in the extending directions L of the tooth portions 12, i.e., in the radial directions of the core sheet 1 are lowered, making it possible to lower the magnetic reluctance and thereby improve the magnetic properties in the circumferential direction C of the annular core sheet 1. On the other hand, in the tooth portions 12, with the insulation coating 31 remaining thereon, it becomes possible to prevent the magnetic properties in the radial directions of the core sheet 1 from being lowered.

As above, with the manufacturing method according to the present embodiment, it becomes possible to manufacture the core sheet 1 which has the magnetic properties of the core back portion 11 in the circumferential direction C improved while maintaining the excellent magnetic properties of the tooth portions 12 in the radial directions of the core sheet 1. That is, it becomes possible to improve the magnetic properties of the entire core sheet 1.

Moreover, the core sheet 1, which has the insulation coating 31 on the tooth portions 12 but no insulation coating 31 on the core back portion 11 as illustrated in FIG. 4, is excellent in both the magnetic properties of the tooth portions 12 in the respective extending directions L thereof and the magnetic properties of the core back portion 11 in the circumferential direction C. Specifically, in the tooth portions 12, since the tension applied to the grain-oriented magnetic steel sheet 3 by the insulation coating 31 is maintained, the ease of magnetization in the radial directions of the core sheet 1 is kept at a high level. On the other hand, in the core back portion 11, since the tension applied to the grain-oriented magnetic steel sheet 3 by the insulation coating 31 is relieved or eliminated, the ease of magnetization in the radial directions of the core sheet 1 is lowered while the ease of magnetization in the circumferential direction C of the annular core back portion 11 is improved.

The above expression □has no insulation coating on the core back portion□denotes that no insulation coating 31 is formed on substantially all regions of the core back portion 11. However, inevitable residual traces of the insulation coating 31, which cannot be avoided during performing the above-described removing step, may be tolerated. Such residual is generally minute.

It is preferable that the tooth portions 12 have, substantially in their entirety, the insulation coating 31. In this case, in the tooth portions 12, the tension in the easy direction RD of magnetization is sufficiently maintained by the insulation coating 31. Consequently, in the tooth portions 12, the magnetic reluctance in the respective extending directions L thereof can be kept sufficiently low.

The above expression □the tooth portions have, substantially in their entirety, the insulation coating□denotes that the insulation coating is formed over substantially all regions of the tooth portions. However, inevitable peeling of the insulation coating 31, which cannot be avoided during performing the above-described rolling step, may be tolerated. Such peeling is generally minute.

As above, the core sheet 1, which has the insulation coating 31 on the tooth portions 12 but no insulation coating 31 on the core back portion 11 as illustrated in FIG. 4, is excellent in magnetic properties in the desired directions in both the tooth portions 12 and the core back portion 11. That is, the tooth portions 12 have sufficiently low magnetic reluctances in the respective extending directions L thereof and thus exhibit excellent magnetic properties. Moreover, the core back portion 11 has its magnetic reluctance in the circumferential direction C lowered and thus also exhibits excellent magnetic properties.

In the case of the insulation coating 31 on the core back portion 11 being partially removed in the removing step, in the core back portion 11, there are formed, as illustrated in FIG. 5, both the non-coating-remaining regions 112 from which the insulation coating 31 has been removed and the coating-remaining regions 111 in which the insulation coating 31 remains. The preferable formation patterns of the non-coating-remaining regions 112 and the coating-remaining regions 111 will be described hereinafter with reference to FIGS. 5 and 6.

Figure 6:
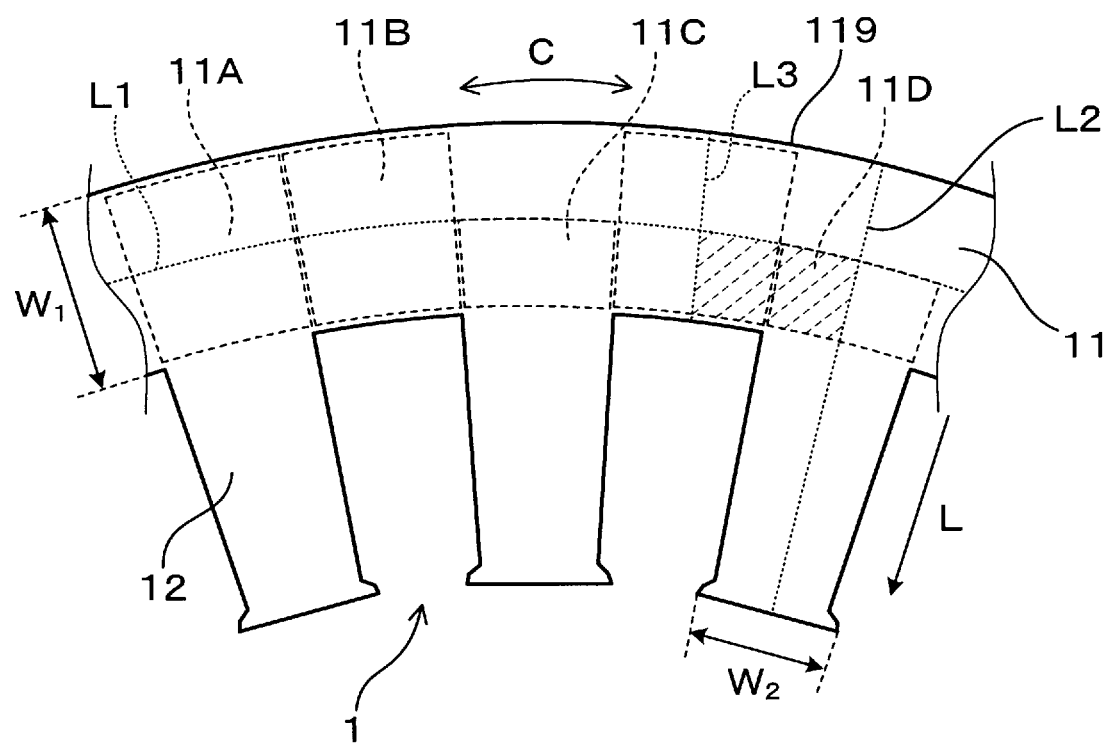
FIG. 6 is an enlarged plan view of a core sheet according to the first embodiment, illustrating various regions in the core back portion.

As shown in FIG. 6, the core back portion 11 has tooth portion-extending regions 11A and non-tooth portion-extending regions 11B located alternately. Hereinafter, the tooth portion-extending regions will be simply referred to as □extending regions□ whenever appropriate and the non-tooth portion-extending regions will be simply referred to as □non-extending regions□whenever appropriate.

The extending regions 11A are those regions of the core back portion 11 from which the tooth portions 12 respectively extend. On the other hand, the non-extending regions 11B are those regions of the core back portion 11 from which no tooth portions 12 extend. In FIG. 6, the extending regions 11A and the non-extending regions 11B are surrounded with dashed lines. It should be noted that to avoid overlapping between the dashed lines and overlapping between the dashed lines and an outer peripheral edge 119 of the core sheet 1, in FIG. 6, the extending regions 11A and the non-extending regions 11B are shown in dimensions slightly smaller than the actual dimensions thereof.

In the example illustrated in FIG. 5, rhomboid coating-remaining regions 111 are formed respectively in the extending regions 11A of the core back portion 11. As illustrated in the figure, the coating-remaining regions 111 may be formed at the center of a width W1 of the core back portion 11.

As illustrated in FIG. 5 and FIG. 6, it is preferable to remove the insulation coating 31 in the removing step so as to have the coating-remaining regions 111 formed respectively in the extending regions 11A of the core back portion 11 and the non-coating-remaining regions 112 formed respectively in the non-extending regions 11B of the core back portion 11. In this case, the tension in the non-extending regions 11B of the core back portion 11 is relieved or eliminated. Consequently, it becomes possible to lower the magnetic reluctance in the circumferential direction C and thereby improve the magnetic properties at least in the non-extending regions 11B of the core back portion 11. As a result, as illustrated in FIG. 5, it becomes easy for a magnetic circuit as indicated with dashed-line arrows to be formed between each adjacent pair of the tooth portions 12 and the core back portion 11 in the core sheet 1. In addition, the non-coating-remaining regions 112 may be formed either over the entire non-extending regions 11B or in only part of the non-extending regions 11B.

On the other hand, by forming the coating-remaining regions 111 respectively in the extending regions 11A as illustrated in FIG. 5 and FIG. 6, it is possible to enhance, when a plurality of core sheets 1 are laminated to form, for example, a stator core of a rotating electric machine, electrical insulation between the core back portions 11 of the core sheets 1. More specifically, it is possible to enhance electrical insulation between the extending regions 11A of the core back portions 11 of the core sheets 1. Consequently, it is possible to suppress eddy current loss in the core back portions 11 of the core sheets 1. In addition, the coating-remaining regions 111 may be formed either over the entire extending regions 11A or in only part of the extending regions 11A.

Moreover, it is preferable to remove the insulation coating 31 in the removing step so as to have the non-coating-remaining regions 112 formed in boundary regions 11D between root regions 11C and the non-extending regions 11B in the core back portion 11. In this case, the tension in the boundary regions 11D is relieved or eliminated. Consequently, it becomes possible to lower the magnetic reluctance in the circumferential direction C and thereby improve the magnetic properties at least in the boundary regions 11D. As a result, it becomes easy for a magnetic circuit as indicated with the dashed-line arrows in FIG. 5 to be formed between each adjacent pair of the tooth portions 12 and the core back portion 11 in the core sheet 1.

As shown in FIG. 6, each of the root regions 11C is a region of the core back portion 11 which is located at the root of one of the tooth portions 12 extending from the core back portion 11. Each of the root regions 11C is included in one of the extending regions 11A and located closer than a centerline L1, which bisects the width W1 of the core back portion 11, to the tooth portions 12.

Each of the boundary regions 11D is a region which includes the boundary between one of the root regions 11C and one of the non-extending regions 11B. Each of the boundary regions 11D is located closer than the centerline L1, which bisects the width W1 of the core back portion 11, to the tooth portions 12. Moreover, each of the boundary regions 11D is located closer than a line L2, which bisects a width W2 of the tooth portion 12, to the non-extending region 11B. Furthermore, each of the boundary regions 11D is located closer than a line L3, which extends in the width direction of the core back portion 11 to bisect the non-extending region 11B, to the extending region 11A. Each of the boundary regions 11D is a region as shown by dashed hatching in FIG. 6. In addition, the non-coating-remaining regions 112 may be formed either over the entire boundary regions 11D or in only part of the boundary regions 11D.

To sum up, with the manufacturing method according to the present embodiment, it becomes possible to manufacture the core sheet 1 which has the magnetic properties of the core back portion 11 in the circumferential direction C improved while maintaining the excellent magnetic properties of the tooth portions 12 in the radial directions of the core sheet 1. As a result, it becomes possible to improve the magnetic properties of the entire core sheet 1. Moreover, the core sheet 1, which has the insulation coating 31 on the tooth portions 12 but no insulation coating 31 on the core back portion 11, is excellent in magnetic properties in the desired directions in both the tooth portions 12 and the core back portion 11.

Second Embodiment

In the present embodiment, a core sheet 1 is manufactured by sequentially performing a rolling step and a removing step after a blanking step. In addition, from the second embodiment on, unless specified otherwise, elements having reference signs identical to those used hitherto are identical to the elements having the identical reference signs in the previous embodiment.

Figure 7A:
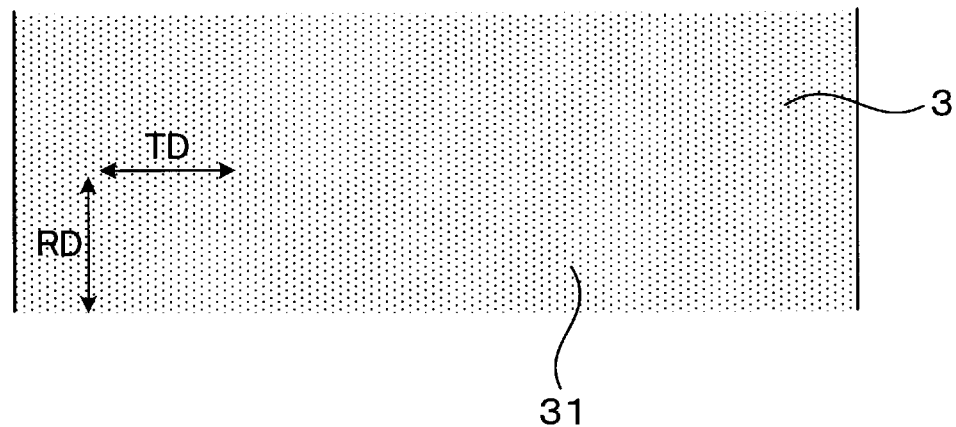
FIG. 7A is a plan view of a grain-oriented magnetic steel sheet according to a second embodiment.
Figure 7B:
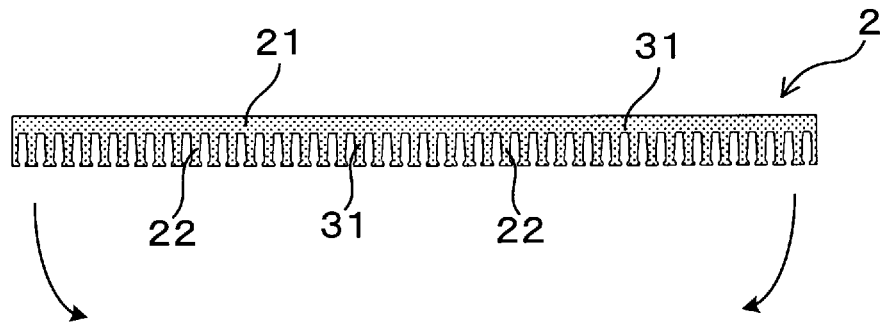
FIG. 7B is a plan view of a sheet piece according to the second embodiment.
Figure 7C:
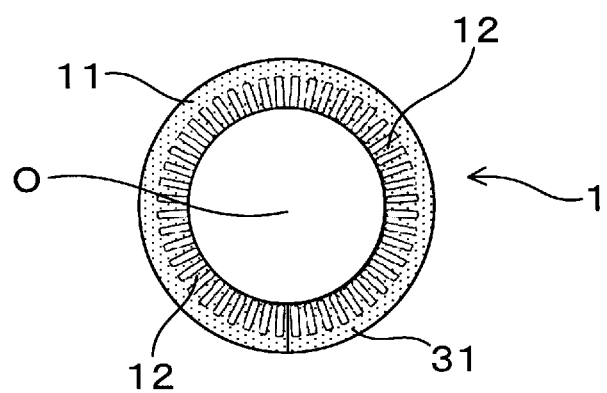
FIG. 7C is a plan view of a core sheet, which has an insulation coating, according to the second embodiment.

In the present embodiment, as illustrated in FIG. 7A and FIG. 7B, first, a blanking process is performed on a grain-oriented magnetic steel sheet 3 to obtain a sheet piece 2 which has a band-shaped core back portion 21 and parallel tooth portions 22, as in the first embodiment. Then, in the rolling step, as illustrated in FIG. 7B and FIG. 7C, the sheet piece 2 is rolled, with the parallel tooth portions 22 being on the inner side, into an annular shape. Consequently, a core sheet 1 is obtained which has a core back portion 11 and tooth portions 12. As illustrated in FIG. 7C, the core sheet 1 after the rolling step has an insulation coating 31 formed on both the core back portion 11 and the tooth portions 12.

Figure 7D:
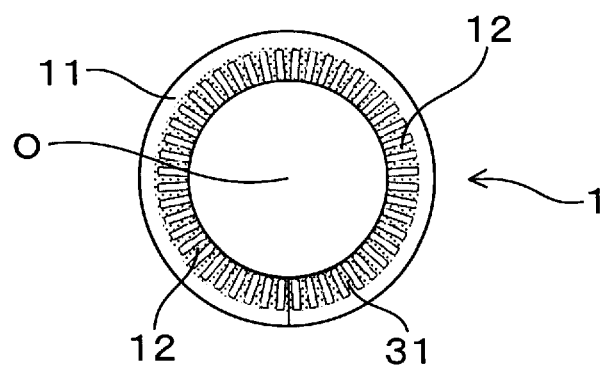
FIG. 7D is a plan view of the core sheet according to the second embodiment, where the insulation coating has been removed from a core back portion.

Next, in the removing step, as illustrated in FIG. 7D, the insulation coating 31 on the core back portion 11 of the core sheet 1 is removed. At this time, it is preferable to have the insulation coating 31 on the tooth portions 12 left without being removed.

Specifically, in the present embodiment, each of the above steps may be performed in the same manner as in the first embodiment. An annealing step may be performed after the blanking step. In this way, the same core sheet 1 as in the first embodiment can be obtained. The other details may be configured the same as in the first embodiment and thus may achieve the same advantageous effects as in the first embodiment.

Third Embodiment

In the present embodiment, a core sheet 1 identical to the core sheet 1 according to the first embodiment is manufactured by sequentially performing a blanking step and a rolling step after a removing step.

Figure 8A:
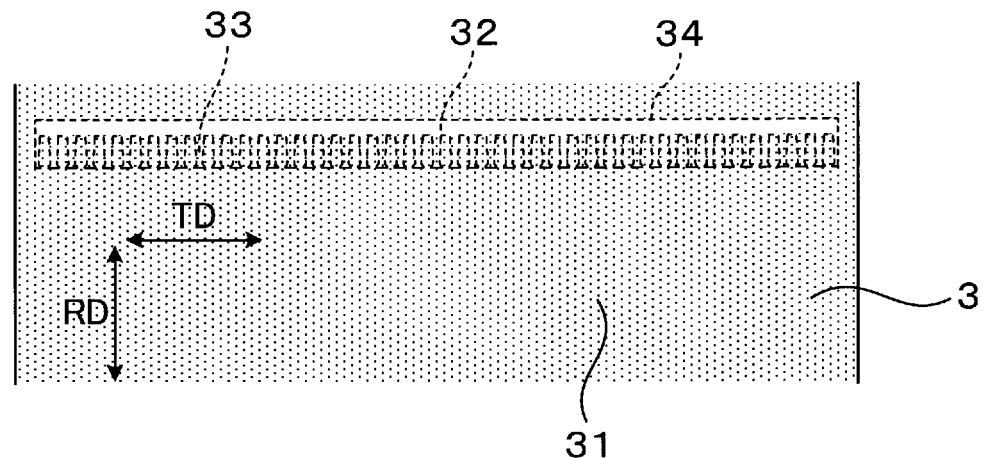
FIG. 8A is a plan view of a grain-oriented magnetic steel sheet according to a third embodiment, where an insulation coating has been removed from a region for forming a core back portion.

As illustrated in FIG. 8A, first, a region 32 for forming a band-shaped core back portion is determined in a grain-oriented magnetic steel sheet 3. The region 32 for forming a band-shaped core back portion, which has the same shape as a band-shaped core back portion 21 of a sheet piece 2 to be obtained after the blanking step, is an imaginary region in the grain-oriented magnetic steel sheet 3 before the blanking process is actually performed. In other words, the region 32 for forming a band-shaped core back portion is like a blueprint on the grain-oriented magnetic steel sheet 3.

When determining the region 32 for forming a band-shaped core back portion, it is also possible to determine regions 33 for forming parallel tooth portions and thus a region 34 for forming a sheet piece. The regions 33 will form parallel tooth portions 22 after the blanking step. The region 34 will form a sheet piece 2 after the blanking step. That is, it is necessary to determine at least the region 32 for forming a band-shaped core back portion; the region 32 extends in a perpendicular direction TD to the easy direction RD of magnetization in the grain-oriented magnetic steel sheet 3.

In the removing step, as illustrated in FIG. 8A, an insulation coating 31 on the region 32 for forming a band-shaped core back portion is at least partially removed. At this time, it is preferable to have the insulation coating 31 on the regions 33 for forming parallel tooth portions left without being removed.

Figure 8B:
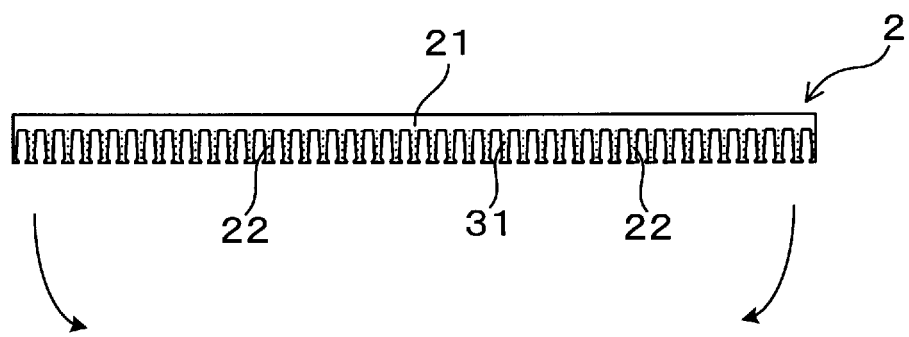
FIG. 8B is a plan view of a sheet piece according to the third embodiment, which has a band-shaped core back portion from which the insulation coating has been removed.

Next, by performing a blanking process on the grain-oriented magnetic steel sheet 3, the sheet piece 2 is obtained which has the band-shaped core back portion 21 and the parallel tooth portions 22 as illustrated in FIG. 8B. Specifically, the blanking process is performed so as to have the band-shaped core back portion 21 formed of the predetermined region 32 for forming a band-shaped core back portion.

That is, the band-shaped core back portion 21 is formed, by the blanking process, of the region 32 for forming a band-shaped core back portion; the region 32 exists in the grain-oriented magnetic steel sheet 3. The sheet piece 2 obtained as above has the band-shaped core back portion 21 from which the insulation coating 31 has been at least partially removed.

Figure 8C:
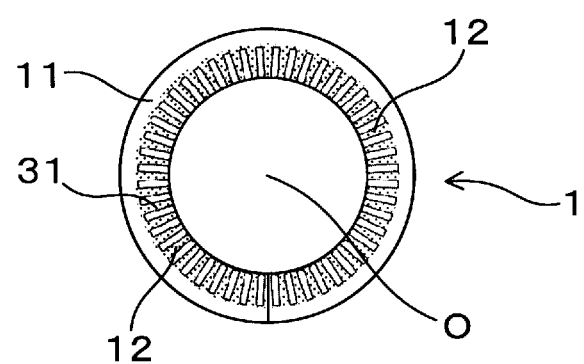
FIG. 8C is a plan view of a core sheet according to the third embodiment, which has a core back portion from which the insulation coating has been removed.

Next, in the rolling step, as illustrated in FIG. 8B, the sheet piece 2 is rolled, with the parallel tooth portions 22 being on the inner side, into an annular shape. Consequently, as illustrated in FIG. 8C, a core sheet 1 identical to the core sheet 1 according to the first embodiment is obtained. In addition, an annealing step may be performed after the blanking step.

Specifically, in the present embodiment, each of the above steps may be performed in the same manner as in the first embodiment. In the case of performing the removing step before the blanking step as in the present embodiment, it is possible to continuously perform the removing step and the blanking step using the same press machine, such as a press machine of the so-called transfer press type. That is, as illustrated in FIG. 8A and FIG. 8B, it is possible to continuously perform, by automatic processing, both the removal of the insulation coating 31 from the region 32 for forming a band-shaped core back portion and the blanking out of the sheet piece 2 from the grain-oriented magnetic steel sheet 3. Consequently, it becomes possible to perform both the removing step and the blanking step at high speed. In addition, the other details may be configured the same as in the first embodiment and thus may achieve the same advantageous effects as in the first embodiment.

First Comparative Embodiment

Figure 9A:
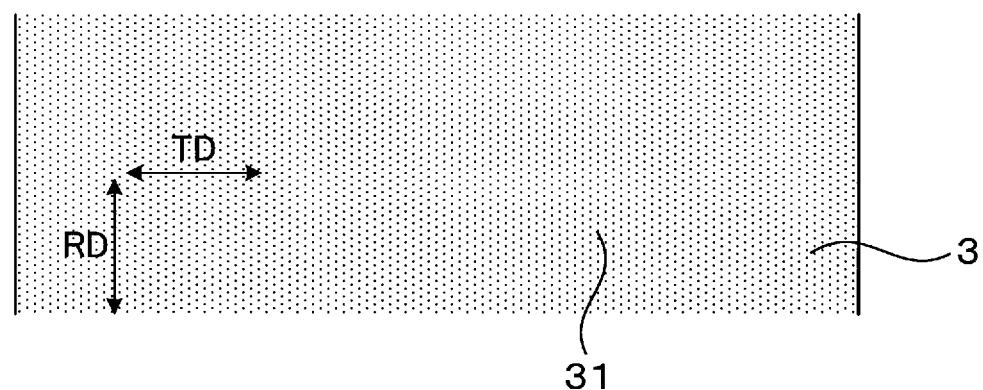
FIG. 9A is a plan view of a grain-oriented magnetic steel sheet according to a first comparative embodiment.
Figure 9B:
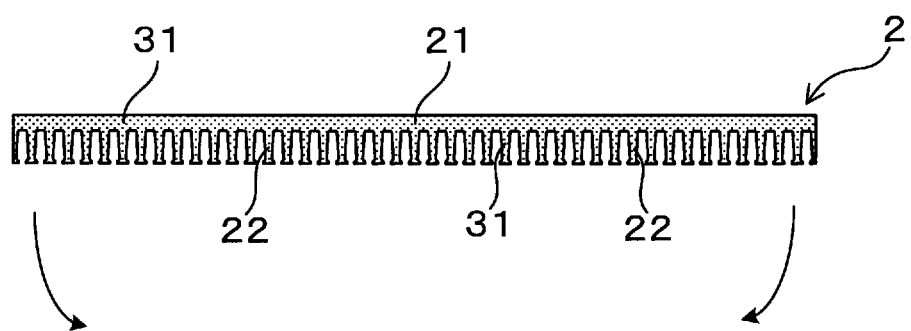
FIG. 9B is a plan view of a sheet piece according to the first comparative embodiment.

In the present embodiment, a core sheet, which has the same shape as the core sheet 1 according to the first embodiment, is manufactured by blanking out a sheet piece 2 from a grain-oriented magnetic steel sheet 3 having an insulation coating 31 and rolling the sheet piece 2 into an annular shape. Specifically, as illustrated in FIGS. 9A and 9B, first, in a blanking step, a sheet piece 2 is made from the grain-oriented magnetic steel sheet 3 in the same manner as in the first embodiment. The sheet piece 2 has a band-shaped core back portion 21 and parallel tooth portions 22. The sheet piece 2 is identical to that described in the first embodiment.

Figure 9C:
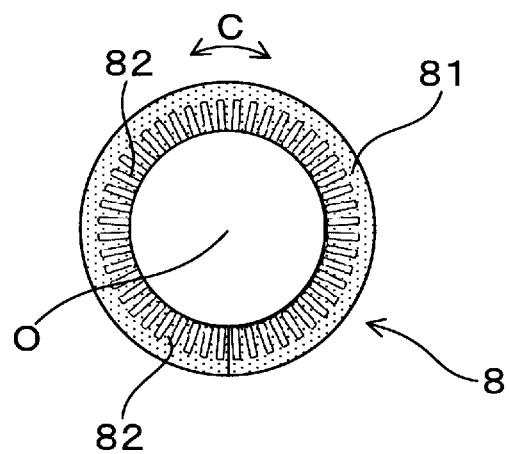
FIG. 9C is a plan view of a core sheet, which has an insulation coating, according to the first comparative embodiment.

Next, in a rolling step, as illustrated in FIG. 9B, the sheet piece 2 is rolled, with the parallel tooth portions 22 being on the inner side, into an annular shape. Consequently, as illustrated in FIG. 9C, a core sheet 8 is obtained which has a core back portion 81 and tooth portions 82. Each of the core back portion 81 and the tooth portions 82 of the core sheet 8 has an insulation coating 31 formed on its surface.

In the present embodiment, the core back portion 81 does not undergo any removing step as described in the first to the third embodiments; therefore the core back portion 81 has the insulation coating 31 remaining thereon. Thus, in the core back portion 81, the tension in the easy direction RD of magnetization of the sheet piece 2 is maintained by the insulation coating 31. Consequently, similar to the tooth portions 82, the core back portion 81 has easy directions of magnetization RD oriented toward the radial center O of the core sheet 8.

In the core sheet 8 described above, the easy directions of magnetization RD in the tooth portions 82 coincide with the desired directions which are toward the radial center O; therefore, the tooth portions 82 have excellent magnetic properties. On the other hand, the easy directions of magnetization RD in the core back portion 81 are perpendicular to the circumferential direction C which is the desired direction. That is, in the core sheet 8, it is difficult for the core back portion 81 to be magnetized; this is undesirable in terms of magnetic properties.

First Experimental Example

In this example, for a test piece of a grain-oriented magnetic steel sheet 3 having an insulation coating 31, the magnetic properties before and after removing the insulation coating 31 were compared and evaluated. First, from a grain-oriented magnetic steel sheet 3 identical to that described in the first embodiment, a test piece was cut out which was 55 mm long in both longitudinal and lateral directions. The thickness of the test piece was equal to 0.23 mm. Then, the insulation coating 31 on the test piece was completely removed by laser peening. As above, a test piece serving as a model of a core back portion was obtained.

Next, the magnetic properties of the test piece were evaluated. The evaluation of the magnetic properties was conducted in compliance with Methods of measurement of the magnetic properties of magnetic steel sheet and strip by means of a single sheet tester☐specified in JIS C 2556 except for the shape of the test piece being a square of 55 mm×55 mm. Specifically, the evaluation of the magnetic properties was conducted by measuring the magnetizing force and the magnetic flux density. The magnetizing force denotes the strength of a magnetic field. In the measurement, a magnetic property detector SK 300 was used which is a product of Metron Technology Research Corporation.

Figure 10:
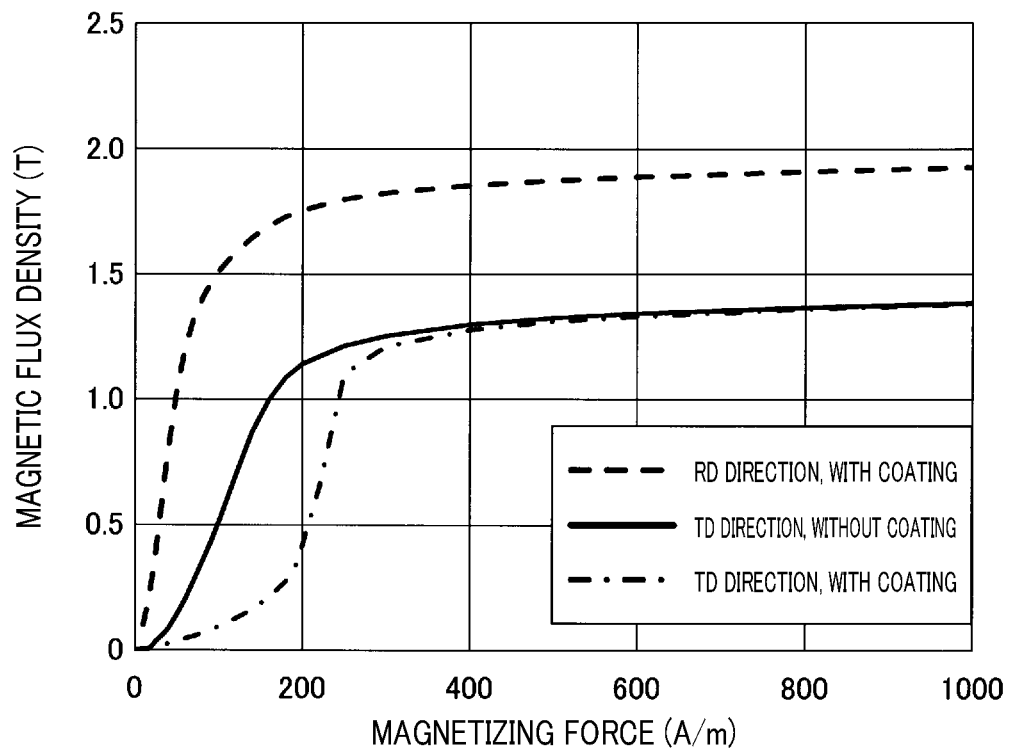
FIG. 10 is a graph illustrating the relationship between the magnetizing force and the magnetic flux density of a grain-oriented magnetic steel sheet before and after removing an insulation coating therefrom according to a first experimental example.

In FIG. 10, there is shown the relationship between the magnetizing force and the magnetic flux density in the perpendicular direction TD to the easy direction RD of magnetization in the test piece having the insulation coating 31 removed therefrom. The measurement conditions were as follows: the frequency F was 50 Hz; and the magnetizing force H was 10-1000 A/m. Moreover, in FIG. 10, there are also shown both the relationship between the magnetizing force and the magnetic flux density in the easy direction RD of magnetization in the test piece before removing the insulation coating 31 therefrom (i.e., the test piece having the insulation coating 31) and the relationship between the magnetizing force and the magnetic flux density in the perpendicular direction TD in the test piece before removing the insulation coating 31 therefrom.

As can be seen from FIG. 10, in the test piece having the insulation coating 31, the magnetic flux density in the easy direction RD of magnetization increased sharply with increase in the magnetizing force. That is, the magnetic permeability was very high and the magnetic reluctance was very low in the easy direction RD of magnetization. In addition, the magnetic permeability is represented by the slope of a tangent line drawn from the origin to each graph in FIG. 10. The magnetic reluctance is the reciprocal of the magnetic permeability.

On the other hand, in the test piece having the insulation coating 31, the magnetic flux density in the perpendicular direction TD to the easy direction RD of magnetization increased at a small rate with increase in the magnetizing force. That is, the magnetic permeability was low and the magnetic reluctance was high in the perpendicular direction TD.

In the test piece having the insulation coating 31 removed therefrom (i.e., the test piece having no insulation coating 31), the rate of increase in the magnetic flux density in the perpendicular direction TD was higher than in the test piece having the insulation coating 31. That is, the magnetic permeability was improved and the magnetic reluctance was lowered in the perpendicular direction TD. This means that by relieving or eliminating the tension through removal of the insulation coating 31, the magnetic reluctance was lowered and the magnetic properties in the perpendicular direction TD were improved.

That is, from this example, it is clear that by removing the insulation coating 31 from the core back portion as described in the above embodiments, the magnetic properties of the core back portion in the circumferential direction C, which is the desired easy direction RD of magnetization in the core back portion, can be improved.

Second Experimental Example

In this example, magnetic properties were compared between core sheets having insulation coatings on their respective core back portions and core sheets having no insulation coatings on their respective core back portions. Specifically, the relationship of the magnetic properties with the intervals between the tooth portions 12 and the length of the tooth portions 12 was investigated.

First, in the same manner as described in the first embodiment, core sheets 1 were made each of which had no insulation coating 31 on its core back portion 11. Moreover, for use of comparison, in the same manner as described in the first comparative embodiment, core sheets 8 were made each of which had an insulation coating 31 on its core back portion 81. In addition, each of these core sheets 1 and 8 had an insulation coating 31 on its tooth portions 12 or 82.

Figure 11:
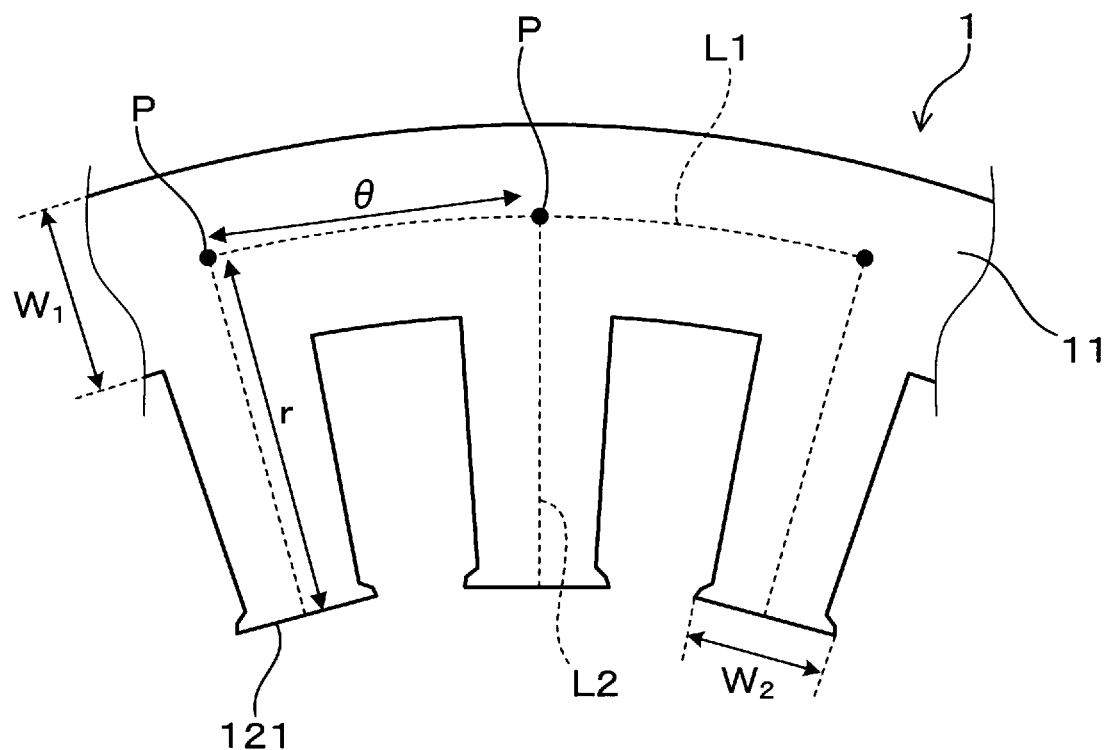
FIG. 11 is an enlarged plan view of a core sheet according to a second experimental example, illustrating various dimensions of a core back portion and tooth portions of the core sheet.

As illustrated in FIG. 11, in each of the core sheets 1, there exists a plurality of intersection points P between the centerline L1 and the centerlines L2. The centerline L1 bisects the width W1 of the core back portion 11. Each of the centerlines L2 bisects the width W2 of one of the tooth portions 12.

In this example, the core sheets 1 were made varying the ratio r/θ between the distance r from the intersection points P to distal ends 121 of the corresponding tooth portions 12 and the distance θ between each adjacent pair of the intersection points P. The core sheets 1 which were different in r/θ and each had no insulation coating 31 on the core back portion 11 were made as embodying examples. On the other hand, the core sheets 8 which were different in r/θ and each had the insulation coating 31 on the core back portion 81 were made as comparative examples. In addition, the distance θ relates to the number of poles in an electric motor. Specifically, the number of poles decreases with increase in θ and increases with decrease in θ.

For each of the core sheets 1 made as the embodying examples and the core sheets 8 made as the comparative examples, the magnetic reluctance in the circumferential direction C (i.e., the perpendicular direction TD) in the core back portion 11 or 81 was measured. The measurement method of the magnetic reluctance was the same as described in the first experimental example. The measurement results are shown in FIG. 12.

Figure 12:
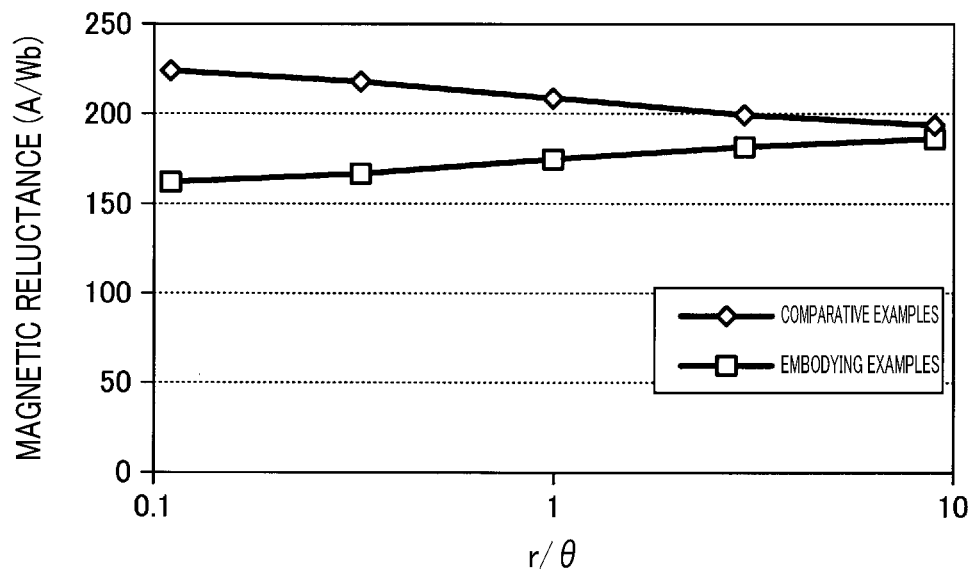
FIG. 12 is an explanatory diagram illustrating the relationship between r/θ and the magnetic reluctance in the core sheet according to the second experimental example.

As can be seen from FIG. 12, the embodying examples each having no insulation coating 31 on the core back portion 11 had the lower magnetic reluctance in the perpendicular direction TD than and thus were superior in magnetic properties to the comparative examples each having the insulation coating 31 on the core back portion 81. Moreover, the effect of removing the insulation coating 31 on improvement of the magnetic properties was remarkable when r/θ≤10. In terms of making this effect more remarkable, it is preferable that r/θ≤5, and more preferable that r/θ≤4.

On the other hand, in terms of making the easy directions RD of magnetization in the tooth portions 12, which extend toward the radial center O of the annular core sheet 1, coincident with the respective extending directions L of the tooth portions 12 and thereby lowering the magnetic reluctance of the magnetic circuit formed in the core sheet 1, it is preferable that r/θ≥0.1, and more preferable that r/θ≥1.0.

First Modification

In this modification, examples of modifying the coating-remaining regions 111 and the non-coating-remaining regions 112, which are formed in the removing step, will be described. More particularly, in this modification, patterns of the coating-remaining regions 111 formed at the center of the width W1 of the core back portion 11 and the non-coating-remaining regions 112 will be illustrated.

Figure 13:
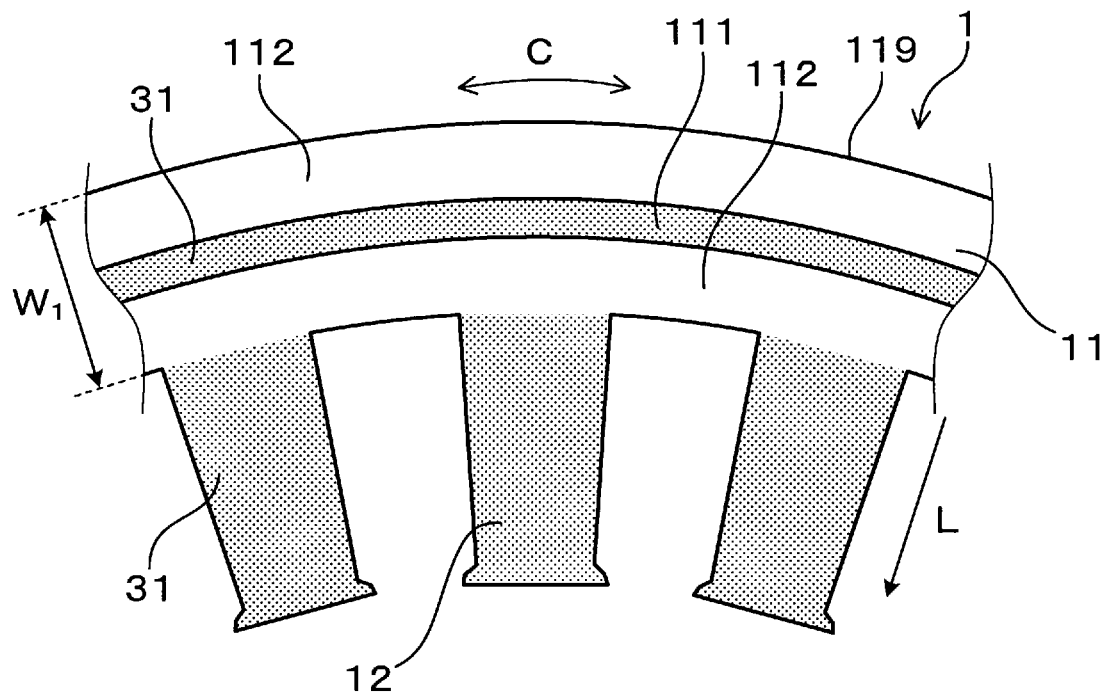
FIG. 13 is an enlarged plan view of a core sheet according to a first modification, which has a core back portion where a band-shaped coating-remaining region is formed.

As illustrated in FIG. 13, a band-shaped coating-remaining region 111 may be formed to extend in the circumferential direction C of the core back portion 11. In this case, on both the tooth portions 12 side and the outer peripheral edge 119 side of the coating-remaining region 111, there are formed the non-coating-remaining regions 112 to extend in the shape of a band. In addition, the width of the coating-remaining region 111 in the width direction of the core back portion 11 may be suitably adjusted.

Figure 14:
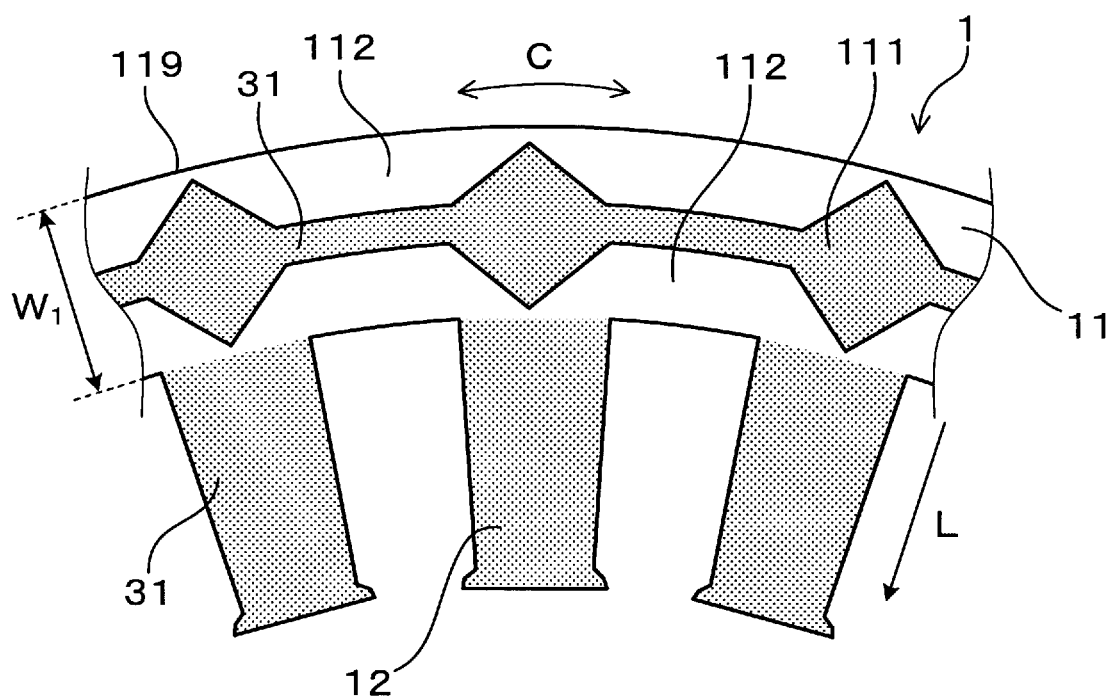
FIG. 14 is an enlarged plan view of a core sheet according to the first modification, which has a core back portion where both rhomboid coating-remaining regions and band-shaped coating-remaining regions are formed.

Alternatively, as illustrated in FIG. 6 and FIG. 14, rhomboid coating-remaining regions 111 may be formed respectively in the extending regions 11A of the core back portion 11, and band-shaped coating-remaining regions 111 may be formed to extend in the circumferential direction C so as to connect the rhomboid coating-remaining regions 111. In this case, on both the tooth portions 12 side and the outer peripheral edge 119 side of the coating-remaining regions 111, there are formed the non-coating-remaining regions 112. In addition, the size of the rhomboid coating-remaining regions 111 and the width of the band-shaped coating-remaining regions 111 may be suitably adjusted.

In the present modification, there are formed the coating-remaining region(s) 111 in the extending regions 11A of the core back portion 11 and the non-coating-remaining regions 112 in the non-extending regions 11B of the core back portion 11, as in the first embodiment. Moreover, in the boundary regions 11D, there are also formed the non-coating-remaining regions 112. Consequently, it becomes easy for a magnetic circuit to be formed between each adjacent pair of the tooth portions 12 and the core back portion 11 in the core sheet 1.

Fourth Embodiment

In the present embodiment, in the removing step, the insulation coating 31 is removed so as to have coating-remaining regions 111 formed in an outer peripheral edge 119-side part of the core back portion 11 and non-coating-remaining region(s) 112 formed in a tooth portions 12-side part of the core back portion 11. In addition, the removing step may be performed by various peening methods as described in the first embodiment.

Figure 15:
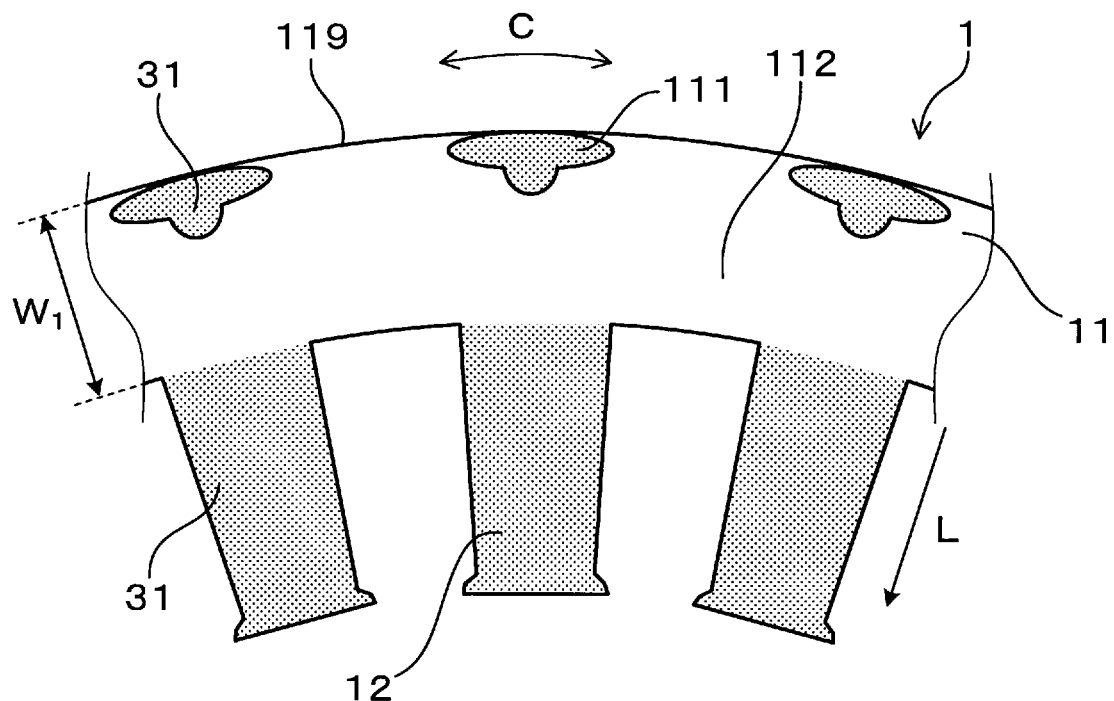
FIG. 15 is an enlarged plan view of a core sheet according to a fourth embodiment, which has a core back portion where convex coating-remaining regions are formed, each of the convex coating-remaining regions having a protruding part that extends toward one tooth portion of the core sheet.

As illustrated in FIG. 15, coating-remaining regions 111 may be formed along the outer peripheral edge 119 of the core back portion 11. In this case, it is easy to prevent or suppress, when a plurality of core sheets 1 are laminated to form, for example, a stator core of a rotating electric machine, electrical insulation between the core back portions 11 of the core sheets 1 from being lowered. As a result, it is possible to more effectively suppress eddy current loss in the core back portions 11 of the core sheets 1. In addition, it may be easy for electrical insulation between the core back portions 11 of the core sheets 1 to be lowered at the outer peripheral edges 119 of the core back portions 11; however, by forming the coating-remaining regions 111 on the outer peripheral edge 119-side parts of the core back portions 11, it becomes possible to suppress the electrical insulation from being lowered.

On the tooth portions 12-side of the coating-remaining regions 111 in the core back portion 11, there is formed a non-coating-remaining region 112. As above, in the present embodiment, there are formed the coating-remaining regions 111 in the extending regions 11A of the core back portion 11 and the non-coating-remaining region 112 in the non-extending regions 11B of the core back portion 11, as in the first embodiment. Moreover, in the boundary regions 11D, there is also formed the non-coating-remaining region 112. Consequently, it becomes easy for a magnetic circuit to be formed between each adjacent pair of the tooth portions 12 and the core back portion 11 in the core sheet 1. The other details may be configured the same as in the first embodiment and thus may achieve the same advantageous effects as in the first embodiment.

In addition, in the present embodiment, the coating-remaining regions 111 are formed along the outer peripheral edge 119 of the core back portion 11 and convex in shape; each of the convex coating-remaining regions 111 has a protruding part that extends toward one of the tooth portions 12. The height of the protruding parts of the convex coating-remaining regions 111 and the width of the coating-remaining regions 111, which extend along the outer peripheral edge 119, in the circumferential direction C may be suitably adjusted.

Second Modification

In this modification, patterns of coating-remaining regions 111 formed in an outer peripheral edge 119-side part of the core back portion 11 will be illustrated.

Figure 16:
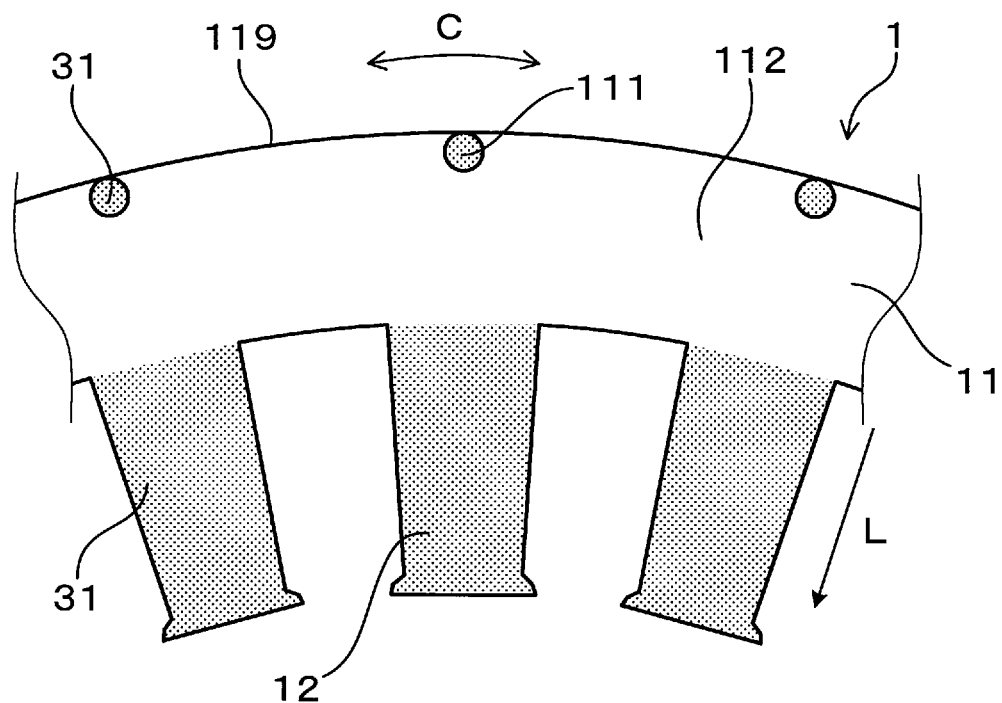
FIG. 16 is an enlarged plan view of a core sheet according to a second modification, which has a core back portion where circular coating-remaining regions are formed.
Figure 17:
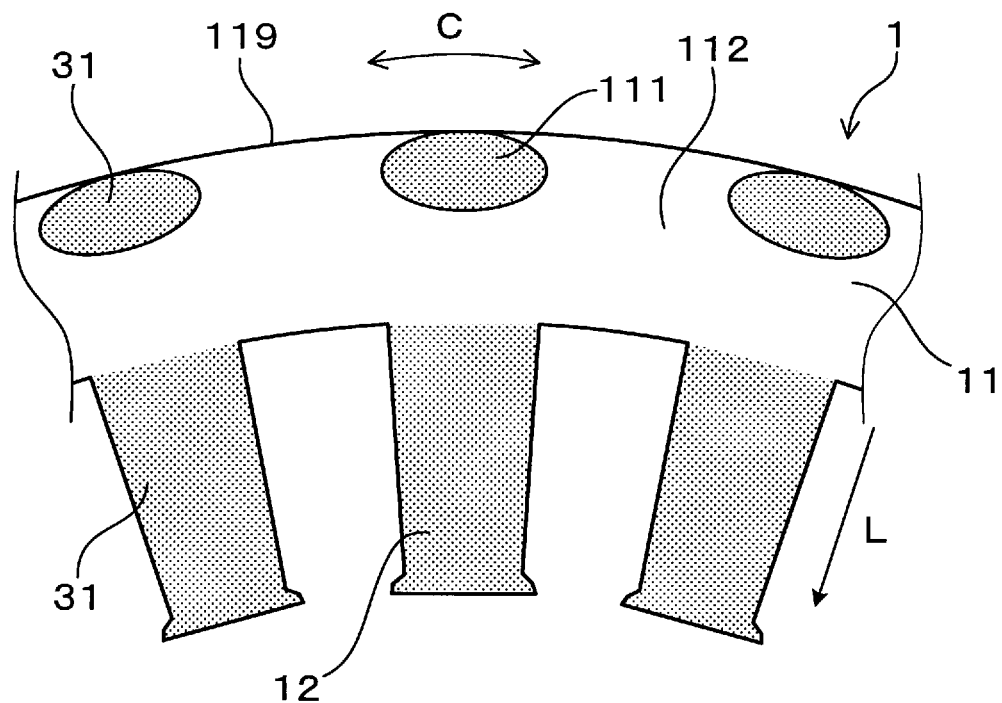
FIG. 17 is an enlarged plan view of a core sheet according to the second modification, which has a core back portion where elliptical coating-remaining regions are formed, each of the elliptical coating-remaining regions having its major axis oriented in the circumferential direction.
Figure 18:
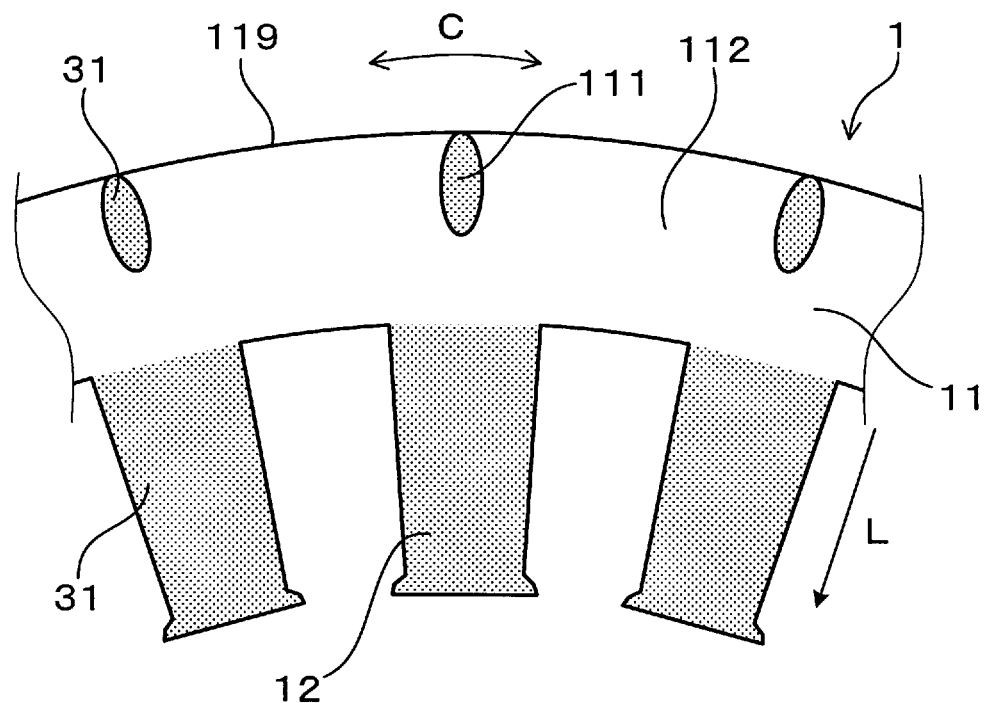
FIG. 18 is an enlarged plan view of a core sheet according to the second modification, which has a core back portion where elliptical coating-remaining regions are formed, each of the elliptical coating-remaining regions having its major axis oriented in the extending direction of one tooth portion of the core sheet.

As illustrated in FIG. 16 to FIG. 18, in the outer peripheral edge 119-side part of the core back portion 11, there may be formed circular coating-remaining regions 111. Each of the coating-remaining regions 111 may have the shape of a perfect circle as illustrated in FIG. 16, the shape of an ellipse having its major axis oriented in the circumferential direction C as illustrated in FIG. 17, or the shape of an ellipse having its major axis oriented in the width direction of the core back portion 11 as illustrated in FIG. 18.

Figure 19:
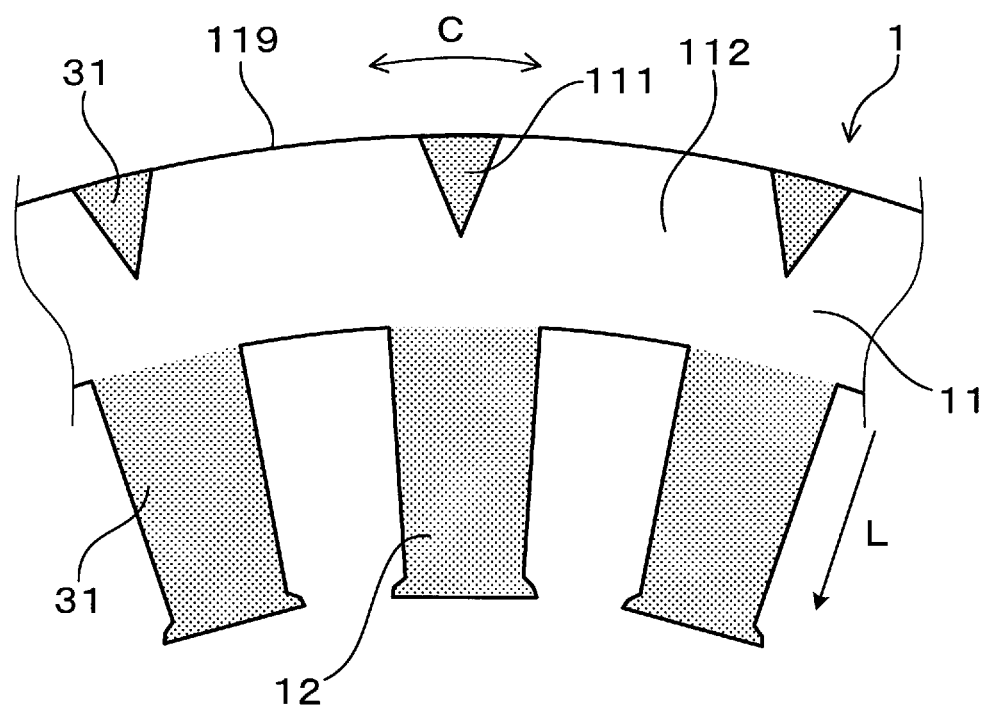
FIG. 19 is an enlarged plan view of a core sheet according to the second modification, which has a core back portion where fan-shaped coating-remaining regions are formed.

As illustrated in FIG. 19, in the outer peripheral edge 119-side part of the core back portion 11, there may be formed fan-shaped coating-remaining regions 111 each of which extends from the outer peripheral edge 119 of the core back portion 11 toward one of the tooth portions 12.

Figure 20:
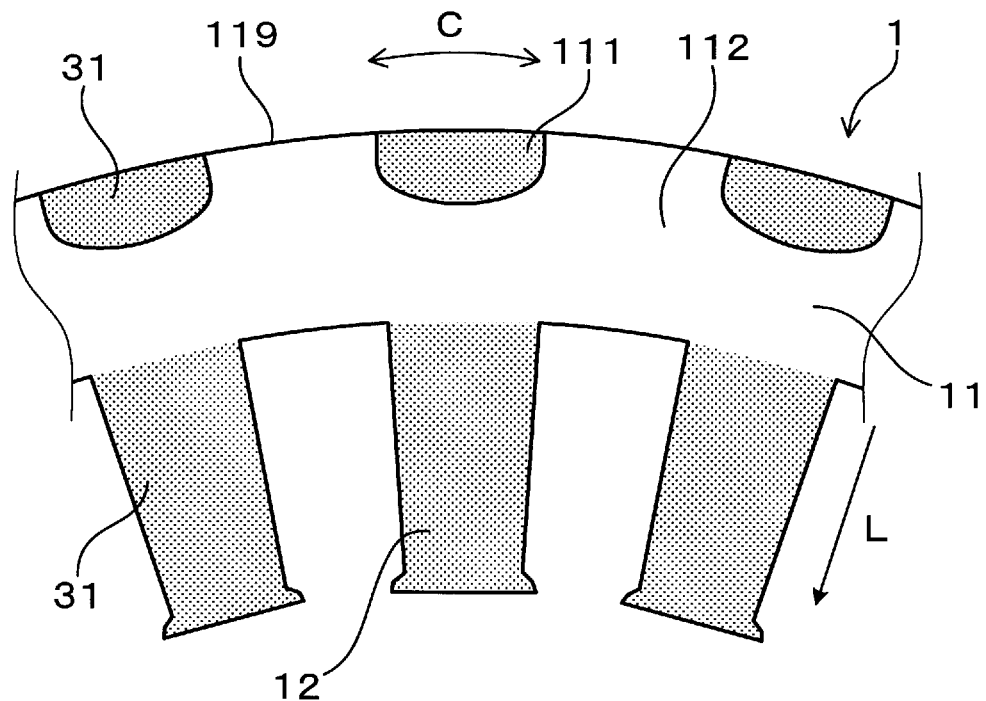
FIG. 20 is an enlarged plan view of a core sheet according to the second modification, which has a core back portion where mountain-shaped coating-remaining regions are formed.

As illustrated in FIG. 20, in the outer peripheral edge 119-side part of the core back portion 11, there may be formed mountain-shaped coating-remaining regions 111 each of which extends from the outer peripheral edge 119 of the core back portion 11 toward one of the tooth portions 12.

Figure 21:
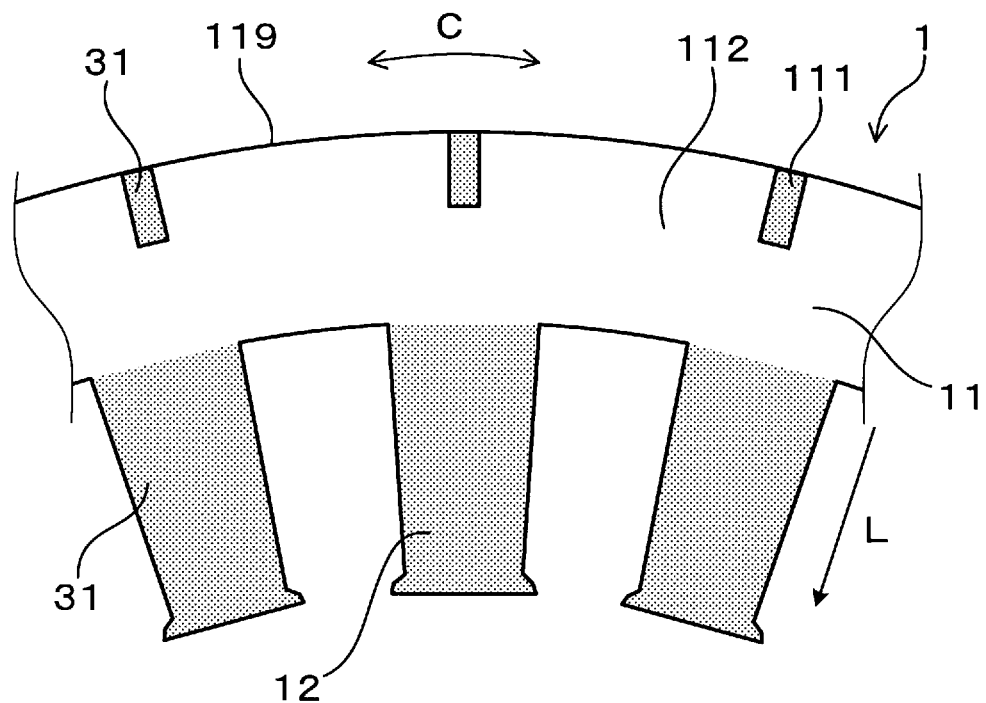
FIG. 21 is an enlarged plan view of a core sheet according to the second modification, which has a core back portion where rod-shaped coating-remaining regions are formed.

As illustrated in FIG. 21, in the outer peripheral edge 119-side part of the core back portion 11, there may be formed rod-shaped coating-remaining regions 111 each of which extends from the outer peripheral edge 119 of the core back portion 11 toward one of the tooth portions 12.

In the present modification, though the height of the coating-remaining regions 111 extending from the outer peripheral edge 119 of the core back portion 11 and the width of the coating-remaining regions 111 in the circumferential direction C may be suitably changed, it is preferable to have the non-coating-remaining region(s) 112 formed at the roots of the tooth portions 12 as illustrated in FIG. 16 to FIG. 21. In this case, it is easy for a magnetic circuit to be formed between each adjacent pair of the tooth portions 12 and the core back portion 11 in the core sheet 1.

Third Modification

In this modification, formation patterns of coating-remaining regions 111 extending from the outer peripheral edge 119 of the core back portion 11 to the roots of the tooth portions 12 will be illustrated. The roots of the tooth portions 12 are boundary portions between the core back portion 11 and the tooth portions 12.

Figure 22:
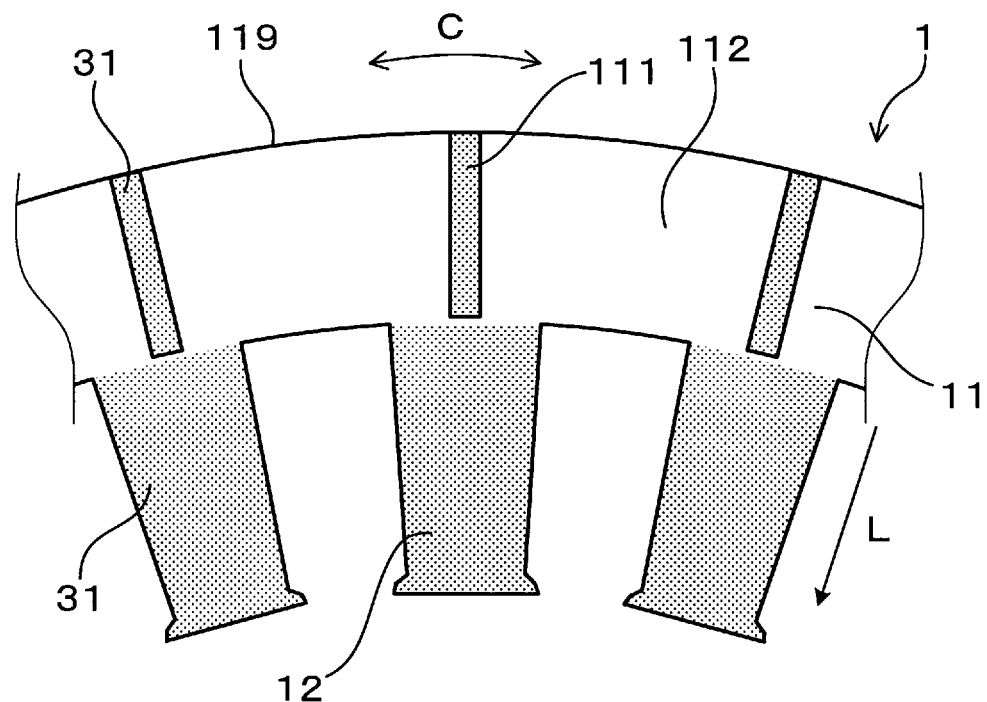
FIG. 22 is an enlarged plan view of a core sheet according to a third modification, which has a core back portion where rod-shaped coating-remaining regions are formed in tooth portion-extending regions.
Figure 23:
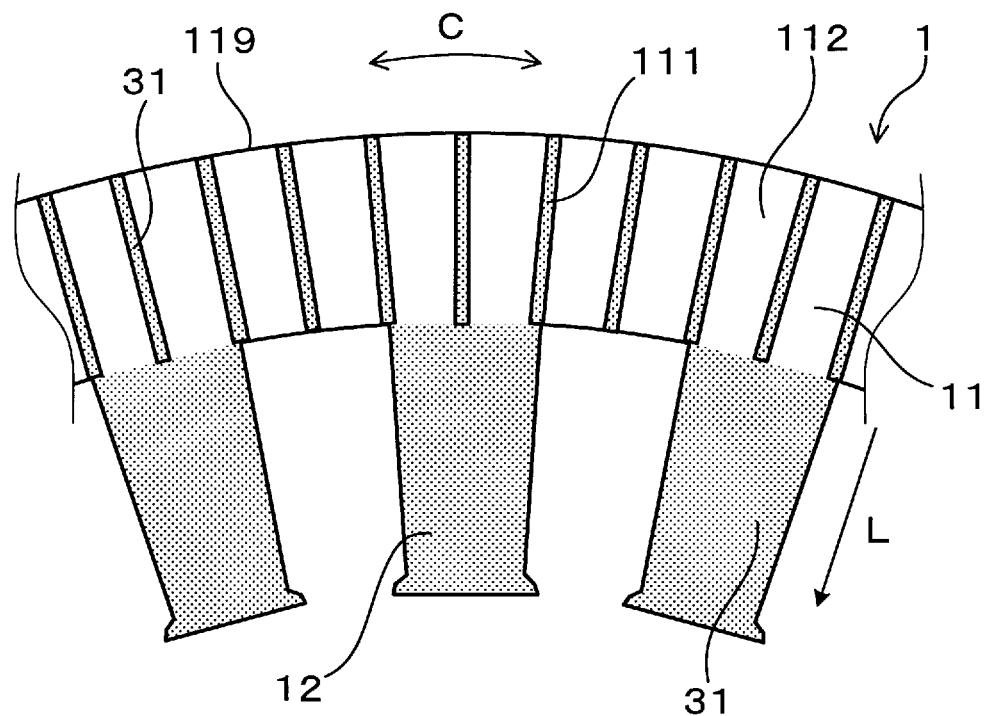
FIG. 23 is an enlarged plan view of a core sheet according to the third modification, which has a core back portion where rod-shaped coating-remaining regions are formed in both tooth portion-extending regions and non-tooth portion-extending regions.

As illustrated in FIG. 22 and FIG. 23, in the core back portion 11, there may be formed rod-shaped coating-remaining regions 111 which extend from the outer peripheral edge 119 of the core back portion 11 to the roots of the tooth portions 12. Specifically, the rod-shaped coating-remaining regions 111 may be formed respectively in the extending regions 11A of the core back portion 11 as illustrated in FIG. 22. Alternatively, a number of rod-shaped coating-remaining regions 111 may be formed, for example at equal intervals, in both the extending regions 11A and the non-extending regions 11B of the core back portion 11 as illustrated in FIG. 23. The intervals are not necessarily set to be equal, but may be changed. In the case of forming a number of rod-shaped coating-remaining regions 111, it is preferable to set the width of each of the coating-remaining regions 111 in the circumferential direction C to be small. In this case, when the rolling step is performed after the removing step, it is difficult for crushed powder of the insulation coating 31 to be produced in the rolling step.

Figure 24:
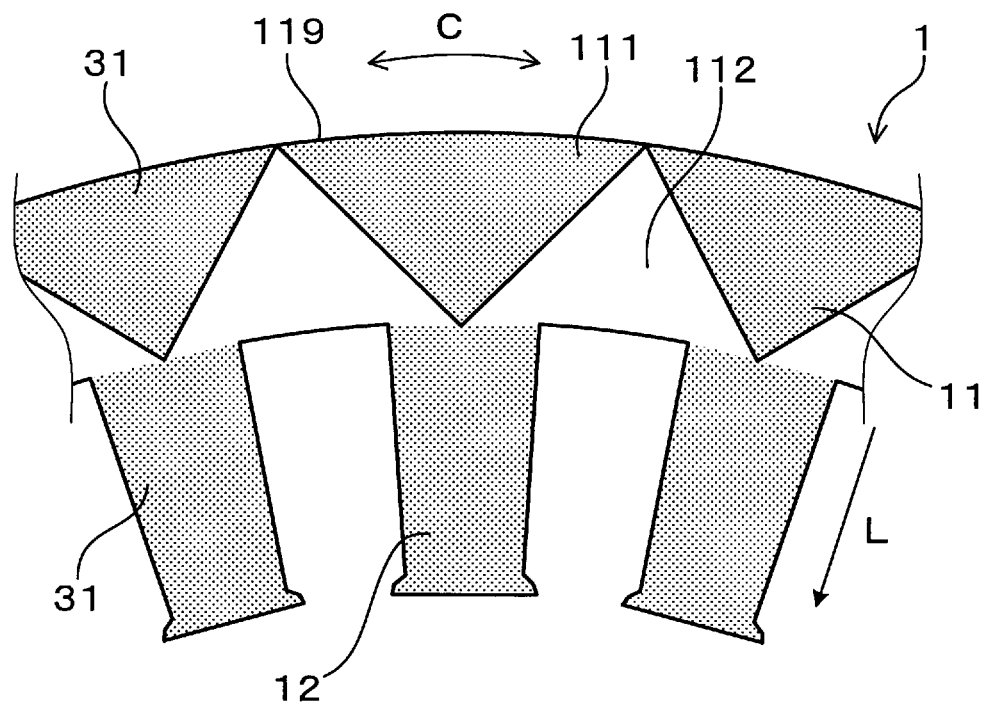
FIG. 24 is an enlarged plan view of a core sheet according to the third modification, which has a core back portion where fan-shaped coating-remaining regions are formed continuously in the circumferential direction.

As illustrated in FIG. 24, in the core back portion 11, there may be formed fan-shaped coating-remaining regions 111 which extend from the outer peripheral edge 119 of the core back portion 11 to the roots of the tooth portions 12. In the example illustrated in FIG. 24, each of the fan-shaped coating-remaining regions 111 is formed to have two ends of the arc of the fan shape located respectively in two adjacent non-extending regions 11B; all the fan-shaped coating-remaining regions 111 are continuously connected with one another in the circumferential direction C. In this case, it is possible to increase the area of the coating-remaining regions 111 while maintaining a magnetic circuit formed between each adjacent pair of the tooth portions 12 and the core back portion 11 in the core sheet 1. Consequently, it becomes possible to enhance, when a plurality of core sheets 1 are laminated, electrical insulation between the core back portions 11 of the core sheets 1.

Figure 25:
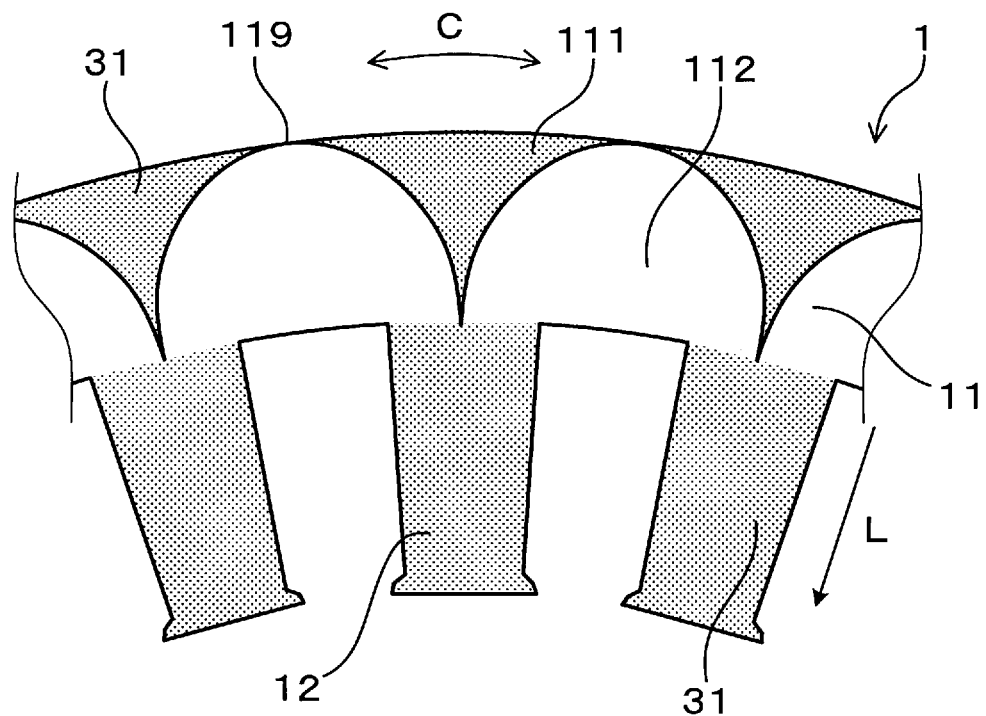
FIG. 25 is an enlarged plan view of a core sheet according to the third modification, which has a core back portion where semielliptical non-coating-remaining regions are formed continuously in the circumferential direction.

Moreover, the two straight lines that define the central angle of each of the fan-shaped coating-remaining regions 111 illustrated in FIG. 24 may be curved inward of the coating-remaining region 11 as illustrated in FIG. 25. In this case, the non-coating-remaining regions 112 formed in the non-extending regions 11B and the boundary regions 11D of the core back portion 11 become larger than the fan-shaped coating-remaining regions 111 illustrated in FIG. 24. Consequently, it becomes easier for a magnetic circuit to be formed between each adjacent pair of the tooth portions 12 and the core back portion 11 in the core sheet 1. That is, it becomes possible to further improve the magnetic properties of the core back portion 11 in the circumferential direction C.

While the above particular embodiments and modifications have been shown and described, it will be understood by those skilled in the art that various further modifications, changes, and improvements may be made without departing from the spirit of the present disclosure.

What is claimed is:

1. A method of manufacturing a core sheet, the core sheet having an annular core back portion and a plurality of tooth portions extending from the annular core back portion toward a radial center thereof,
the method comprising steps of:
blanking out a sheet piece from a grain-oriented magnetic steel sheet, the grain-oriented magnetic steel sheet having an easy direction of magnetization in one in-plane direction and an insulation coating formed on its surface to apply tension in the easy direction of magnetization, the sheet piece having a band-shaped core back portion extending in a perpendicular direction to the easy direction of magnetization and a plurality of parallel tooth portions extending, from the band-shaped core back portion, parallel to the easy direction of magnetization;
rolling the sheet piece, with the parallel tooth portions being on an inner side, into an annular shape, thereby obtaining the core sheet having the core back portion and the tooth portions; and
partially removing the insulation coating on the band-shaped core back portion of the sheet piece or the insulation coating on the core back portion of the core sheet.

2. The method as set forth in claim 1, wherein the rolling the sheet piece is performed after the partially removing the insulation coating.

3. The method as set forth in claim 1, wherein in the partially removing the insulation coating, the insulation coating is removed by laser peening, shot peening or water jet peening.

4. The method as set forth in claim 1, wherein in the partially removing the insulation coating, the insulation coating is partially removed to form a non-coating-remaining region having the insulation coating removed therefrom and a coating-remaining region having the insulation coating remaining thereon.

5. The method as set forth in claim 4, wherein in the partially removing the insulation coating, the insulation coating is removed so as to have the coating-remaining region formed on an outer peripheral edge side in the core back portion and the non-coating-remaining region formed on the tooth portions side in the core back portion.

6. The method as set forth in claim 4, wherein the core back portion has tooth portion-extending regions and non-tooth portion-extending regions located alternately, the tooth portion-extending regions having the tooth portions respectively extending therefrom, the non-tooth portion-extending regions having no tooth portions extending therefrom, and
in the partially removing the insulation coating, the insulation coating is removed so as to have the coating-remaining region formed in the tooth portion-extending regions and the non-coating-remaining region formed in the non-tooth portion-extending regions.

7. The method as set forth in claim 6, wherein in the partially removing the insulation coating, the insulation coating is removed so as to have the non-coating-remaining region formed also in boundary regions of the core back portion between root regions of the tooth portions and the non-tooth portion-extending regions.

8. The method as set forth in claim 1, wherein the core sheet satisfies a relationship of $r/\theta \leq 10$, where $\theta$ is a distance between intersection points, at which a centerline bisecting the core back portion in its width direction intersects centerlines each bisecting one of the tooth portions in its width direction, and r is a distance from the intersection points to distal ends of the corresponding tooth portions.

9. A method of manufacturing a core sheet, the core sheet having an annular core back portion and a plurality of tooth portions extending from the annular core back portion toward a radial center thereof,
the method comprising steps of:
partially removing, from a grain-oriented magnetic steel sheet having an easy direction of magnetization in one in-plane direction and an insulation coating formed on its surface to apply tension in the easy direction of magnetization, the insulation coating on a region for forming a band-shaped core back portion which extends in a perpendicular direction to the easy direction of magnetization;
blanking out a sheet piece from the grain-oriented magnetic steel sheet, the sheet piece having a band-shaped core back portion present in the region for forming a band-shaped core back portion and a plurality of parallel tooth portions extending, from the band-shaped core back portion, parallel to the easy direction of magnetization; and
rolling the sheet piece, with the parallel tooth portions being on an inner side, into an annular shape, thereby obtaining the core sheet having the core back portion and the tooth portions.

10. The method as set forth in claim 9, wherein in the partially removing the insulation coating, the insulation coating is removed by laser peening, shot peening or water jet peening.

11. The method as set forth in claim 9, wherein in the partially removing the insulation coating, the insulation coating is partially removed to form a non-coating-remaining region having the insulation coating removed therefrom and a coating-remaining region having the insulation coating remaining thereon.

12. The method as set forth in claim 11, wherein in the partially removing the insulation coating, the insulation coating is removed so as to have the coating-remaining region formed on an outer peripheral edge side in the core back portion and the non-coating-remaining region formed on the tooth portions side in the core back portion.

13. The method as set forth in claim 11, wherein the core back portion has tooth portion-extending regions and non-tooth portion-extending regions located alternately, the tooth portion-extending regions having the tooth portions respectively extending therefrom, the non-tooth portion-extending regions having no tooth portions extending therefrom, and
 in the partially removing the insulation coating, the insulation coating is removed so as to have the coating-remaining region formed in the tooth portion-extending regions and the non-coating-remaining region formed in the non-tooth portion-extending regions.

14. The method as set forth in claim 13, wherein in the partially removing the insulation coating, the insulation coating is removed so as to have the non-coating-remaining region formed also in boundary regions of the core back portion between root regions of the tooth portions and the non-tooth portion-extending regions.

15. The method as set forth in claim 9, wherein the core sheet satisfies a relationship of $r/\theta \leq 10$, where $\theta$ is a distance between intersection points, at which a centerline bisecting the core back portion in its width direction intersects centerlines each bisecting one of the tooth portions in its width direction, and r is a distance from the intersection points to distal ends of the corresponding tooth portions.

* * * * *